United States Patent
Leffert et al.

(10) Patent No.: US 8,381,125 B2
(45) Date of Patent: Feb. 19, 2013

(54) DEVICE AND METHOD FOR RESIZING USER INTERFACE CONTENT WHILE MAINTAINING AN ASPECT RATIO VIA SNAPPING A PERIMETER TO A GRIDLINE

(75) Inventors: Akiva Dov Leffert, San Francisco, CA (US); Peter William Rapp, Pittsburgh, PA (US); Christopher Weeldreyer, San Carlos, CA (US); Jay Christopher Capela, Santa Cruz, CA (US); Jason Robert Marr, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 367 days.

(21) Appl. No.: 12/639,849

(22) Filed: Dec. 16, 2009

(65) Prior Publication Data

US 2011/0145759 A1    Jun. 16, 2011

(51) Int. Cl.
*G06F 3/048* (2006.01)
*G09G 5/00* (2006.01)

(52) U.S. Cl. .................................. 715/800; 345/660
(58) Field of Classification Search .................. 715/780, 715/863, 800; 345/651, 662, 665, 660, 669–671
See application file for complete search history.

(56) References Cited

U.S. PATENT DOCUMENTS

| | | | | |
|---|---|---|---|---|
| 4,885,786 A * | 12/1989 | Anderson et al. | ............ | 382/235 |
| 5,283,561 A * | 2/1994 | Lumelsky et al. | ............ | 715/717 |
| 5,359,703 A | 10/1994 | Robertson et al. | ............ | 395/119 |
| 5,490,241 A * | 2/1996 | Mallgren et al. | ............ | 345/440 |
| 5,581,670 A | 12/1996 | Bier et al. | ............ | 395/326 |
| 6,323,846 B1 | 11/2001 | Westerman et al. | ............ | 345/173 |
| 6,570,557 B1 | 5/2003 | Westerman et al. | ............ | 345/173 |
| 6,677,932 B1 | 1/2004 | Westerman | ............ | 345/173 |
| 6,888,536 B2 | 5/2005 | Westerman et al. | ............ | 345/173 |
| 7,093,192 B2 * | 8/2006 | Mullen et al. | ............ | 715/202 |
| 7,134,093 B2 * | 11/2006 | Etgen et al. | ............ | 715/786 |
| 7,158,158 B1 * | 1/2007 | Fleming et al. | ............ | 345/698 |
| 7,218,226 B2 | 5/2007 | Wehrenberg | ............ | 340/571 |
| 7,469,833 B1 | 12/2008 | Kelley et al. | ............ | 235/462.01 |
| 7,614,008 B2 | 11/2009 | Ording | ............ | 715/773 |
| 7,633,076 B2 | 12/2009 | Huppi et al. | ............ | 250/559.36 |
| 7,653,883 B2 | 1/2010 | Hotelling et al. | ............ | 715/863 |
| 7,657,849 B2 | 2/2010 | Chaudhri et al. | ............ | 715/863 |
| 7,663,607 B2 | 2/2010 | Hotelling et al. | ............ | 345/173 |
| 7,688,306 B2 | 3/2010 | Wehrenberg et al. | ............ | 345/158 |
| 7,694,231 B2 | 4/2010 | Kocienda et al. | ............ | 715/773 |
| 8,209,630 B2 * | 6/2012 | Thimbleby et al. | ............ | 715/801 |
| 2004/0066407 A1 | 4/2004 | Regan et al. | | |
| 2005/0068290 A1 | 3/2005 | Jaeger | | |
| 2005/0071774 A1 * | 3/2005 | Lipsky et al. | ............ | 715/788 |
| 2006/0033724 A1 | 2/2006 | Chaudhri et al. | ............ | 345/173 |
| 2006/0085757 A1 | 4/2006 | Andre et al. | ............ | 715/771 |
| 2006/0161870 A1 | 7/2006 | Hotelling et al. | ............ | 715/863 |
| 2006/0174568 A1 * | 8/2006 | Kinoshita et al. | ............ | 52/395 |

(Continued)

OTHER PUBLICATIONS

Clark, Josh; iWork '09: The Missing Manual, Apr. 14, 2009, O'Reilly Media Inc. XP55001264, ISBN: 978-0-59-615758-6.*

(Continued)

*Primary Examiner* — Doon Chow
*Assistant Examiner* — Wilson Varga
(74) *Attorney, Agent, or Firm* — Fletcher Yoder PC

(57) ABSTRACT

Heuristics for resizing displayed objects within an electronic document are disclosed. The heuristics include resizing displayed objects to predefined ratios, resizing displayed objects by predefined increments, relating resizing of displayed objects to a global reference grid, and resizing a plurality of displayed objects aligned to an axis.

14 Claims, 27 Drawing Sheets

U.S. PATENT DOCUMENTS

| | | | |
|---|---|---|---|
| 2006/0197753 A1 | 9/2006 | Hotelling | 345/173 |
| 2007/0079236 A1 | 4/2007 | Schrier et al. | 715/517 |
| 2007/0152980 A1 | 7/2007 | Kocienda et al. | 345/173 |
| 2007/0257890 A1 | 11/2007 | Hotelling et al. | 345/173 |
| 2008/0022197 A1 | 1/2008 | Bargeron et al. | 715/246 |
| 2008/0100642 A1* | 5/2008 | Betancourt et al. | 345/663 |
| 2008/0140868 A1 | 6/2008 | Kalayjian et al. | 710/8 |
| 2008/0167834 A1 | 7/2008 | Herz et al. | 702/150 |
| 2008/0267468 A1 | 10/2008 | Geiger et al. | 382/128 |
| 2008/0320391 A1 | 12/2008 | Lemay et al. | 715/702 |
| 2009/0231275 A1 | 9/2009 | Odgers | 345/157 |
| 2011/0074710 A1* | 3/2011 | Weeldreyer et al. | 345/173 |
| 2011/0185316 A1* | 7/2011 | Reid et al. | 715/863 |

OTHER PUBLICATIONS

Clark, "iWork '09: The Missing Manual," O'Reilly Media, Inc., Apr. 24, 2009.

Baudisch, "The Cage: Efficient Construction in 3D Using a Cubic Adaptive Grid," 9th Annual Symposium on User Interface Software and Technology, Proceedings of the ACM Symposium on User Interface Software and Technology, Nov. 6, 1996, pp. 171-172.

* cited by examiner

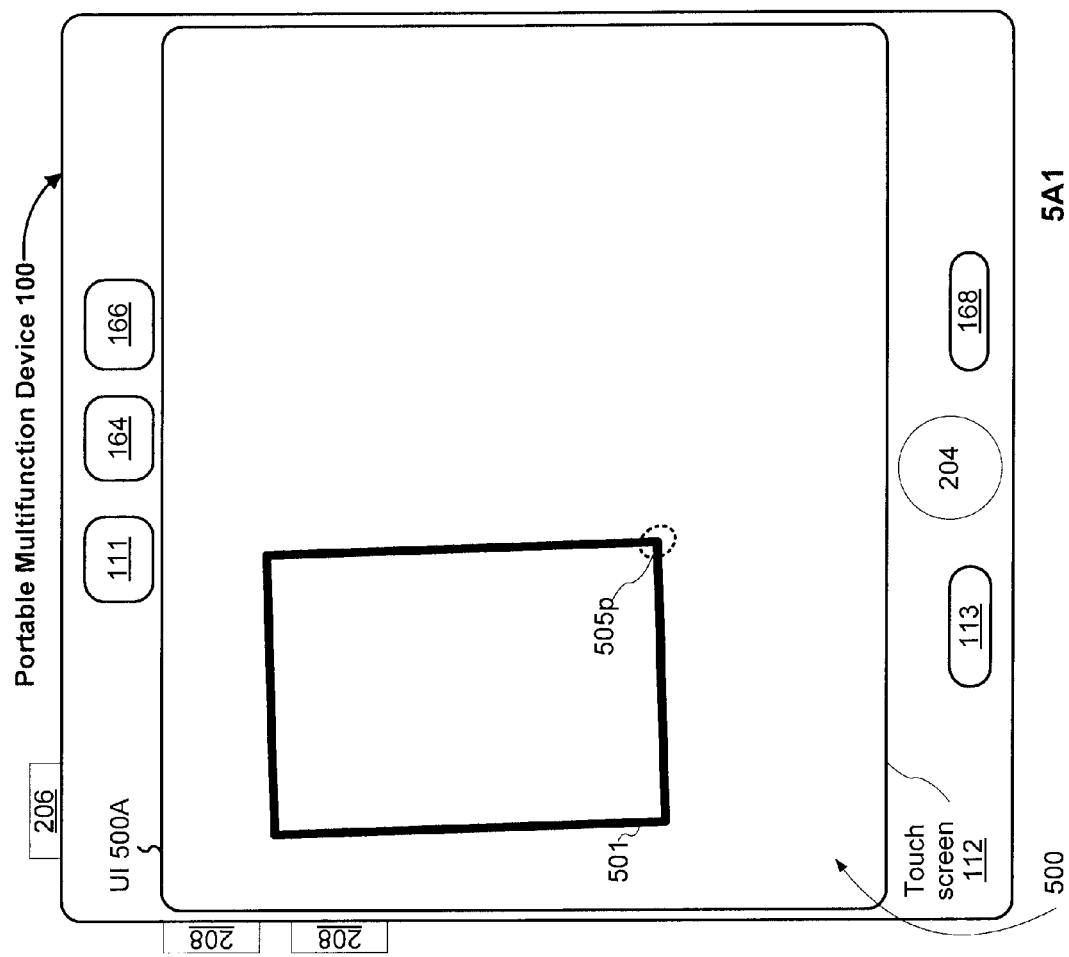

600

| |
|---|
| At a computing device with a display and one or more user input devices adapted to detect user gestures, display on the display a user interface including at least one user interface element, wherein the user interface element is configured to be resized within the user interface in response to user gestures detected with the one or more user input devices, the user interface element has an aspect ratio, and the user interface element is displayed on the display in conjunction with a plurality of gridlines, which include a plurality of x-axis gridlines and a plurality of y-axis gridlines. ⌐602 |
| The at least one user interface element is displayed on an electronic canvas. ⌐604 |
| The user interface element is rotated to an oblique angle on the electronic canvas before detecting the user gesture. ⌐606 |
| The user interface element includes at least a first resize handle and a second resize handle, wherein the first and second resize handles are positioned on opposite sides of the user interface element during the detected user gesture. ⌐608 |
| The display and at least one of the one or more user input devices comprise a touch-screen display. ⌐610 |
| The plurality of gridlines is visibly displayed. ⌐612 |

| |
|---|
| Detect a user gesture performed with one or more of the one or more user input devices, the user gesture corresponding to a gesture to resize the user interface element. ⌐614 |
| The detected user gesture includes a point of contact corresponding to a first resize handle of the two or more resize handles, and a second resize handle of the two or more resize handles corresponds to a second location of the user interface element that is opposite the first resize handle. ⌐615 |

| |
|---|
| In response to detecting the user gesture, resize the user interface element in accordance with the detected user gesture, wherein the detected user gesture has a directional path that intersects at least some of the plurality of gridlines. ⌐616 |

| 652 | At a computing device with a display and one or more user input devices adapted to detect user gestures, display on the display a user interface including at least a first user interface element, wherein the first user interface element is configured to be resized within the user interface in response to user gestures, the first user interface element has a first aspect ratio, the first user interface element has an initial size, the first user interface element includes at least a first resize handle and a second resize handle, and, the first and second resize handles are positioned on opposite sides of the user interface element. |

654 — The user interface element is rotated to an oblique angle on the electronic canvas before detecting the user gesture.

656 — Detect a user gesture performed with one or more of the one or more user input devices, the user gesture corresponding to a gesture to resize the user interface element, and the user gesture performed at a location corresponding to the first resize handle.

658 — In response to detecting the user gesture, resize the user interface element in accordance with the detected user gesture.

660 — While resizing the user interface element in accordance with the detected user gesture, snap the first user interface element to an adjusted size that is different from the initial size, wherein the adjusted size corresponds to a predetermined aspect ratio.

662 — The predetermined aspect ratio is selected from the group consisting of 1:1 aspect ratio, 2:3 aspect ratio, 3:2 aspect ratio, 3:5 aspect ratio, 5:3 aspect ratio, 5:7 aspect ratio, 7:5 aspect ratio, 8:10 aspect ratio, 10:8 aspect ratio, 3:4 aspect ratio, 4:3 aspect ratio, 16:9 aspect ratio, 9:16 aspect ratio, and an aspect ratio of the display.

664 — The predetermined aspect ratio is the first aspect ratio of the first user interface element.

666 — The displayed user interface includes a second user interface element having a second aspect ratio that is different than the first aspect ratio, the second user interface element is within a predefined distance of the first user interface element, and the predetermined aspect ratio is the second aspect ratio.

668 — While detecting the user gesture, display an affordance in conjunction with the user interface element being resized, wherein the affordance is configured to display at least a current size of the user interface element.

670 — While detecting the user gesture, display an affordance in conjunction with the user interface element being resized, wherein the affordance is configured to display at least a current aspect ratio user interface element.

Figure 6C

DEVICE AND METHOD FOR RESIZING USER INTERFACE CONTENT WHILE MAINTAINING AN ASPECT RATIO VIA SNAPPING A PERIMETER TO A GRIDLINE

TECHNICAL FIELD

The disclosed embodiments relate generally to computing devices, and more particularly, to computing devices and methods for managing user interface content and user interface elements.

BACKGROUND

The use of computers and other electronic computing devices to manage user interface content and user interface elements has increased significantly in recent years. Exemplary computing devices that include capabilities of managing user interface content and user interface elements include mobile telephones, desktop computers, laptop computers, tablet computers, electronic book readers, consumer electronics, personal digital assistants, etc.

Many users rely on electronic computing devices for managing user interface content and user interface elements. Unfortunately, existing methods for managing user interface content and user interface elements are cumbersome and inefficient. In addition, existing methods take longer than necessary, thereby wasting energy. This latter consideration is particularly important in battery-operated devices.

Accordingly, there is a need for computing devices with faster, more efficient methods and interfaces for managing user interface content and user interface elements, such as maintaining aspect ratios while resizing user interface content and user interface elements. Such methods and interfaces may complement or replace conventional methods for managing user interface content and user interface elements. Such methods and interfaces reduce the cognitive burden on a user and produce a more efficient human-machine interface. For battery-operated computing devices, such methods and interfaces conserve power and increase the time between battery charges.

SUMMARY

The above deficiencies and other problems associated with user interfaces for computing devices, including those with touch-sensitive surfaces, are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital video recording, web browsing, digital music playing, and/or digital video playing. Executable instructions for performing these functions may be included in a computer readable storage medium or other computer program product configured for execution by one or more processors.

In accordance with some embodiments, a method is performed at a computing device with a display and one or more user input devices adapted to detect user gestures. The method includes displaying on the display a user interface including at least one user interface element, wherein the user interface element is configured to be resized within the user interface in response to user gestures detected with the one or more user input devices, the user interface element has an aspect ratio, and the user interface element is displayed on the display in conjunction with a plurality of gridlines, which include a plurality of x-axis gridlines and a plurality of y-axis gridlines. The method also includes detecting a user gesture performed with one or more of the one or more user input devices, the user gesture corresponding to a gesture to resize the user interface element; in response to detecting the user gesture, resizing the user interface element in accordance with the detected user gesture, wherein the detected user gesture has a directional path that intersects at least some of the plurality of gridlines; while resizing the user interface element in accordance with the detected user gesture, maintaining the aspect ratio of the user interface element, wherein maintaining the aspect ratio of the user interface element includes: when the directional path intersects more x-axis gridlines than y-axis gridlines, snapping a perimeter of the user interface element to respective x-axis gridlines when a respective distance between the perimeter of the user interface element and a respective x-axis gridline is less than a predefined distance threshold, and when the directional path intersects more y-axis gridlines than x-axis gridlines, snapping a perimeter of the user interface element to respective y-axis gridlines when a respective distance between the perimeter of the user interface element and a respective y-axis gridline is less than the predefined distance threshold.

In accordance with some embodiments, a computing device includes a display, one or more user input devices adapted to detect user gestures, one or more processors, memory, and one or more programs. The one or more programs are stored in the memory and configured to be executed by the one or more processors. The one or more programs include instructions for displaying on the display a user interface including at least one user interface element, wherein the user interface element is configured to be resized within the user interface in response to user gestures detected with the one or more user input devices, the user interface element has an aspect ratio, and the user interface element is displayed on the display in conjunction with a plurality of gridlines, which include a plurality of x-axis gridlines and a plurality of y-axis gridlines. The one or more programs also include instructions for detecting a user gesture performed with one or more of the one or more user input devices, the user gesture corresponding to a gesture to resize the user interface element; in response to detecting the user gesture, resizing the user interface element in accordance with the detected user gesture, wherein the detected user gesture has a directional path that intersects at least some of the plurality of gridlines; while resizing the user interface element in accordance with the detected user gesture, maintaining the aspect ratio of the user interface element, wherein maintaining the aspect ratio of the user interface element includes: when the directional path intersects more x-axis gridlines than y-axis gridlines, snapping a perimeter of the user interface element to respective x-axis gridlines when a respective distance between the perimeter of the user interface element and a respective x-axis gridline is less than a predefined distance threshold, and, when the directional path intersects more y-axis gridlines than x-axis gridlines, snapping a perimeter of the user interface element to respective y-axis gridlines when a respective distance between the perimeter of the user interface element and a respective y-axis gridline is less than the predefined distance threshold.

In accordance with some embodiments there is a graphical user interface on a computing device with a display, one or more user input devices adapted to detect user gestures, a memory, and one or more processors to execute one or more programs stored in the memory. The graphical user interface includes a user interface including at least one user interface element configured to be resized within the user interface in response to user gestures detected with the one or more user input devices, the user interface element has an aspect ratio, and the user interface element is displayed on the display in conjunction with a plurality of gridlines, which include a plurality of x-axis gridlines and a plurality of y-axis gridlines, wherein a user gesture performed with one or more of the one or more user input devices is detected, the user gesture corresponding to a gesture to resize the user interface element; in response to detecting the user gesture, the user interface element is resized in accordance with the detected user gesture, wherein the detected user gesture has a directional path that intersects at least some of the plurality of gridlines; while resizing the user interface element in accordance with the detected user gesture, the aspect ratio of the user interface element is maintained, wherein maintaining the aspect ratio of the user interface element includes: when the directional path intersects more x-axis gridlines than y-axis gridlines, a perimeter of the user interface element is snapped to respective x-axis gridlines when a respective distance between the perimeter of the user interface element and a respective x-axis gridline is less than a predefined distance threshold, and when the directional path intersects more y-axis gridlines than x-axis gridlines, a perimeter of the user interface element is snapped to respective y-axis gridlines when a respective distance between the perimeter of the user interface element and a respective y-axis gridline is less than the predefined distance threshold.

In accordance with some embodiments, a computer readable storage medium has stored therein one or more programs, the one or more programs comprising instructions, which when executed by a computing device with a display and one or more user input devices adapted to detect user gestures, cause the computing device to display on the display a user interface including at least one user interface element, wherein the user interface element is configured to be resized within the user interface in response to user gestures detected with the one or more user input devices, the user interface element has an aspect ratio, and the user interface element is displayed on the display in conjunction with a plurality of gridlines, which include a plurality of x-axis gridlines and a plurality of y-axis gridlines. The one or more programs also comprise instructions which cause the computing device to detect a user gesture performed with one or more of the one or more user input devices, the user gesture corresponding to a gesture to resize the user interface element; in response to detecting the user gesture, resize the user interface element in accordance with the detected user gesture, wherein the detected user gesture has a directional path that intersects at least some of the plurality of gridlines; while resizing the user interface element in accordance with the detected user gesture, maintain the aspect ratio of the user interface element, wherein maintaining the aspect ratio of the user interface element includes: when the directional path intersects more x-axis gridlines than y-axis gridlines, snap a perimeter of the user interface element to respective x-axis gridlines when a respective distance between the perimeter of the user interface element and a respective x-axis gridline is less than a predefined distance threshold, and, when the directional path intersects more y-axis gridlines than x-axis gridlines, snap a perimeter of the user interface element to respective y-axis gridlines when a respective distance between the perimeter of the user interface element and a respective y-axis gridline is less than the predefined distance threshold.

In accordance with some embodiments, a computing device includes a display; one or more user input devices adapted to detect user gestures; and means for displaying on the display a user interface including at least one user interface element, wherein the user interface element is configured to be resized within the user interface in response to user gestures detected with the one or more user input devices, the user interface element has an aspect ratio, and the user interface element is displayed on the display in conjunction with a plurality of gridlines, which include a plurality of x-axis gridlines and a plurality of y-axis gridlines. The computing device also includes means for detecting a user gesture performed with one or more of the one or more user input devices, the user gesture corresponding to a gesture to resize the user interface element; in response to detecting the user gesture, means for resizing the user interface element in accordance with the detected user gesture, wherein the detected user gesture has a directional path that intersects at least some of the plurality of gridlines; while resizing the user interface element in accordance with the detected user gesture, means for maintaining the aspect ratio of the user interface element, wherein maintaining the aspect ratio of the user interface element includes: when the directional path intersects more x-axis gridlines than y-axis gridlines, means for snapping a perimeter of the user interface element to respective x-axis gridlines when a respective distance between the perimeter of the user interface element and a respective x-axis gridline is less than a predefined distance threshold, and when the directional path intersects more y-axis gridlines than x-axis gridlines, means for snapping a perimeter of the user interface element to respective y-axis gridlines when a respective distance between the perimeter of the user interface element and a respective y-axis gridline is less than the predefined distance threshold.

In accordance with some embodiments, an information processing apparatus for use in a computing device includes a display, one or more user input devices adapted to detect user gestures, and means for displaying on the display a user interface including at least one user interface element, wherein the user interface element is configured to be resized within the user interface in response to user gestures detected with the one or more user input devices, the user interface element has an aspect ratio, and the user interface element is displayed on the display in conjunction with a plurality of gridlines, which include a plurality of x-axis gridlines and a plurality of y-axis gridlines. The information processing apparatus also includes means for detecting a user gesture performed with one or more of the one or more user input devices, the user gesture corresponding to a gesture to resize the user interface element; in response to detecting the user gesture, means for resizing the user interface element in accordance with the detected user gesture, wherein the detected user gesture has a directional path that intersects at least some of the plurality of gridlines; while resizing the user interface element in accordance with the detected user gesture, means for maintaining the aspect ratio of the user interface element, wherein maintaining the aspect ratio of the user interface element includes: when the directional path intersects more x-axis gridlines than y-axis gridlines, means for snapping a perimeter of the user interface element to respective x-axis gridlines when a respective distance between the perimeter of the user interface element and a respective x-axis gridline is less than a predefined distance threshold, and when the directional path intersects more y-axis gridlines than x-axis gridlines, means for snapping a perimeter of the user interface element to respective y-axis gridlines when a respective distance between the perimeter of the user interface element and a respective y-axis gridline is less than the predefined distance threshold.

In accordance with some embodiments, a method is performed at a computing device with a display and one or more user input devices adapted to detect user gestures. The method includes displaying on the display a user interface including at least a first user interface element, wherein the first user interface element is configured to be resized within the user interface in response to user gestures, the first user interface element has a first aspect ratio, the first user interface element has an initial size, the first user interface element includes at least a first resize handle and a second resize handle, and the first and second resize handles are positioned on opposite sides of the user interface element. The method also includes detecting a user gesture performed with one or more of the one or more user input devices, the user gesture corresponding to a gesture to resize the user interface element, and the user gesture performed at a location corresponding to the first resize handle; in response to detecting the user gesture, resizing the user interface element in accordance with the detected user gesture; while resizing the user interface element in accordance with the detected user gesture, snapping the first user interface element to an adjusted size that is different from the initial size, wherein the adjusted size corresponds to a predetermined aspect ratio.

In accordance with some embodiments, a computing device includes a display, one or more user input devices adapted to detect user gestures, one or more processors, memory, and one or more programs. The one or more programs are stored in the memory and configured to be executed by the one or more processors. The one or more programs include instructions for displaying on the display a user interface including at least a first user interface element, wherein the first user interface element is configured to be resized within the user interface in response to user gestures, the first user interface element has a first aspect ratio, the first user interface element has an initial size, the first user interface element includes at least a first resize handle and a second resize handle, and the first and second resize handles are positioned on opposite sides of the user interface element. The one or more programs also include instructions for detecting a user gesture performed with one or more of the one or more user input devices, the user gesture corresponding to a gesture to resize the user interface element, and the user gesture performed at a location corresponding to the first resize handle; in response to detecting the user gesture, resizing the user interface element in accordance with the detected user gesture; while resizing the user interface element in accordance with the detected user gesture, snapping the first user interface element to an adjusted size that is different from the initial size, wherein the adjusted size corresponds to a predetermined aspect ratio In accordance with some embodiments there is a graphical user interface on a computing device with a display, one or more user input devices adapted to detect user gestures, a memory, and one or more processors to execute one or more programs stored in the memory. The graphical user interface includes a user interface including at least a first user interface element, wherein the first user interface element is configured to be resized within the user interface in response to user gestures, the first user interface element has a first aspect ratio, the first user interface element has an initial size, the first user interface element includes at least a first resize handle and a second resize handle, and, the first and second resize handles are positioned on opposite sides of the user interface element; wherein a user gesture performed with one or more of the one or more user input devices is detected, the user gesture corresponding to a gesture to resize the user interface element, and the user gesture performed at a location corresponding to the first resize handle; in response to detecting the user gesture, the user interface element is resized in accordance with the detected user gesture; and while resizing the user interface element in accordance with the detected user gesture, the first user interface element is snapped to an adjusted size that is different from the initial size, wherein the adjusted size corresponds to a predetermined aspect ratio In accordance with some embodiments, a computer readable storage medium has stored therein one or more programs, the one or more programs comprising instructions, which when executed by a computing device with a display and one or more user input devices adapted to detect user gestures, cause the computing device to display on the display a user interface including at least a first user interface element, wherein the first user interface element is configured to be resized within the user interface in response to user gestures, the first user interface element has a first aspect ratio, the first user interface element has an initial size, the first user interface element includes at least a first resize handle and a second resize handle, and, the first and second resize handles are positioned on opposite sides of the user interface element. The one or more programs also comprise instructions which cause the computing device to detect a user gesture performed with one or more of the one or more user input devices, the user gesture corresponding to a gesture to resize the user interface element, and the user gesture performed at a location corresponding to the first resize handle; in response to detecting the user gesture, resize the user interface element in accordance with the detected user gesture; while resizing the user interface element in accordance with the detected user gesture, snap the first user interface element to an adjusted size that is different from the initial size, wherein the adjusted size corresponds to a predetermined aspect ratio In accordance with some embodiments, a computing device includes a display; one or more user input devices adapted to detect user gestures; and means for displaying on the display a user interface including at least a first user interface element, wherein the first user interface element is configured to be resized within the user interface in response to user gestures, the first user interface element has a first aspect ratio, the first user interface element has an initial size, the first user interface element includes at least a first resize handle and a second resize handle, and the first and second resize handles are positioned on opposite sides of the user interface element. The computing device also includes means for detecting a user gesture performed with one or more of the one or more user input devices, the user gesture corresponding to a gesture to resize the user interface element, and the user gesture performed at a location corresponding to the first resize handle; in response to detecting the user gesture, means for resizing the user interface element in accordance with the detected user gesture; and while resizing the user interface element in accordance with the detected user gesture, means for snapping the first user interface element to an adjusted size that is different from the initial size, wherein the adjusted size corresponds to a predetermined aspect ratio.

In accordance with some embodiments, an information processing apparatus for use in a computing device includes a display, one or more user input devices adapted to detect user gestures, and means for displaying on the display a user interface including at least a first user interface element, wherein the first user interface element is configured to be resized within the user interface in response to user gestures, the first user interface element has a first aspect ratio, the first user interface element has an initial size, the first user interface element includes at least a first resize handle and a second resize handle, and the first and second resize handles are positioned on opposite sides of the user interface element. The information processing apparatus also includes means for detecting a user gesture performed with one or more of the one or more user input devices, the user gesture corresponding to a gesture to resize the user interface element, and the user gesture performed at a location corresponding to the first resize handle; in response to detecting the user gesture, means for resizing the user interface element in accordance with the detected user gesture; and while resizing the user interface element in accordance with the detected user gesture, means for snapping the first user interface element to an adjusted size that is different from the initial size, wherein the adjusted size corresponds to a predetermined aspect ratio.

Thus, the computing devices disclosed herein are provided with faster, more efficient methods and interfaces for managing user interface content and user interface elements, including maintaining aspect ratios while resizing user interface elements during user interface element resize gestures. These computing devices with faster, more efficient methods and interfaces increase user effectiveness, efficiency, and satisfaction. Such methods and interfaces may complement or replace conventional methods for manipulating user interface objects.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 6A-6C are flow diagrams illustrating a method of manipulating user interface objects in accordance with some embodiments.

DESCRIPTION OF EMBODIMENTS

Figure 1A:
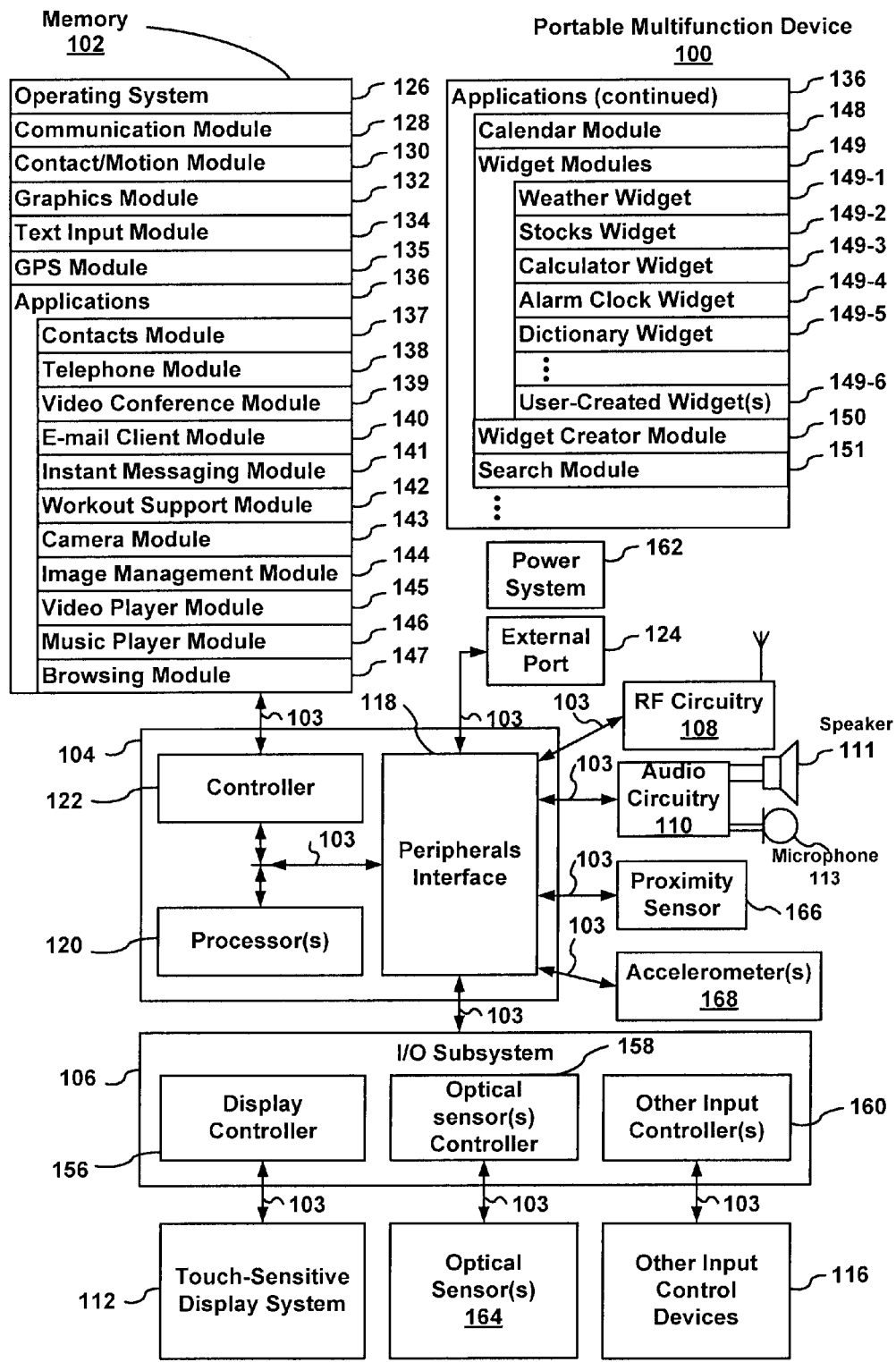
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple, Inc. of Cupertino, Calif. Other portable devices such as laptops or tablet computers with touch-sensitive surfaces (e.g., touch screen displays and/or touch pads) may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
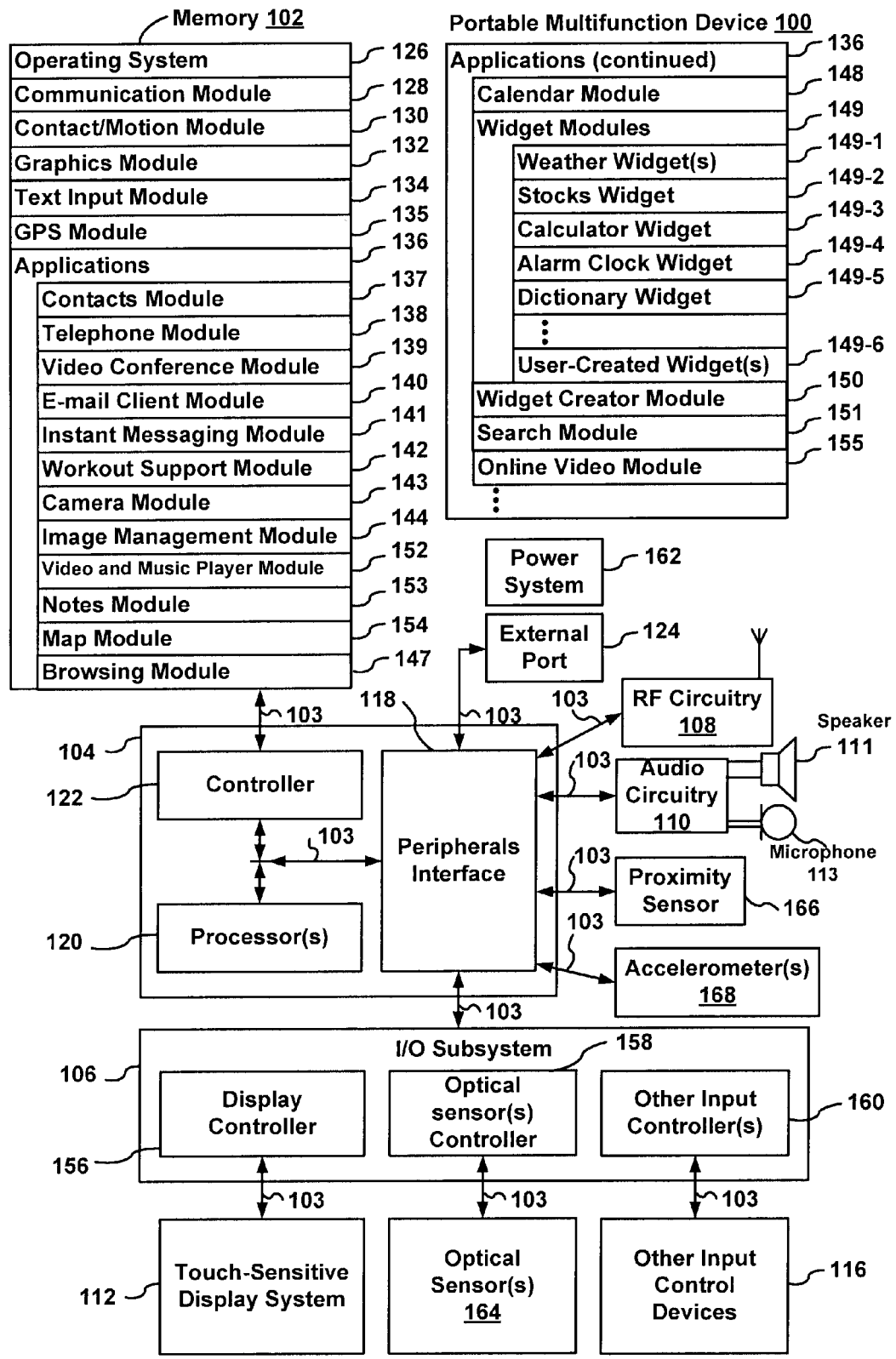

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone). The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple, Inc. of Cupertino, Calif.

A touch-sensitive display in some embodiments of the touch screen 112 may be analogous to the multi-touch sensitive touchpads described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, a touch screen 112 displays visual output from the portable device 100, whereas touch sensitive touchpads do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include a charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector In Handheld Device"; 11/240,788, "Proximity Detector In Handheld Device"; 11/620,702, "Using Ambient Light Sensor To Augment Proximity Sensor Output"; 11/586,862, "Automated Response To And Sensing Of User Activity In Portable Devices"; and 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call).

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 2005/0190059, "Acceleration-based Theft Detection System for Portable Electronic Devices," and U.S. Patent Publication No. 2006/0017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
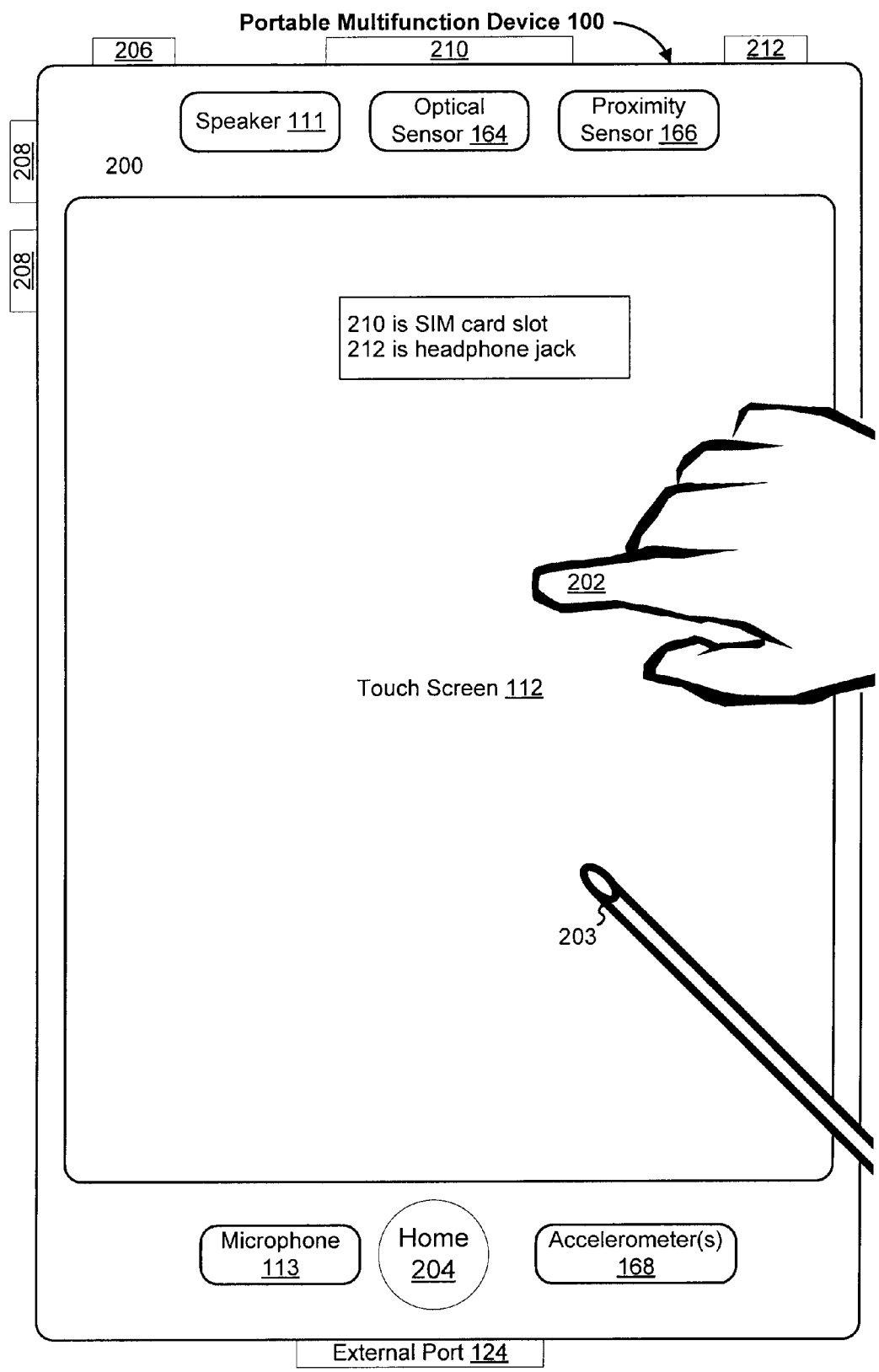
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100 (e.g., applications depicted in FIGS. 1A, 1B and 3). Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
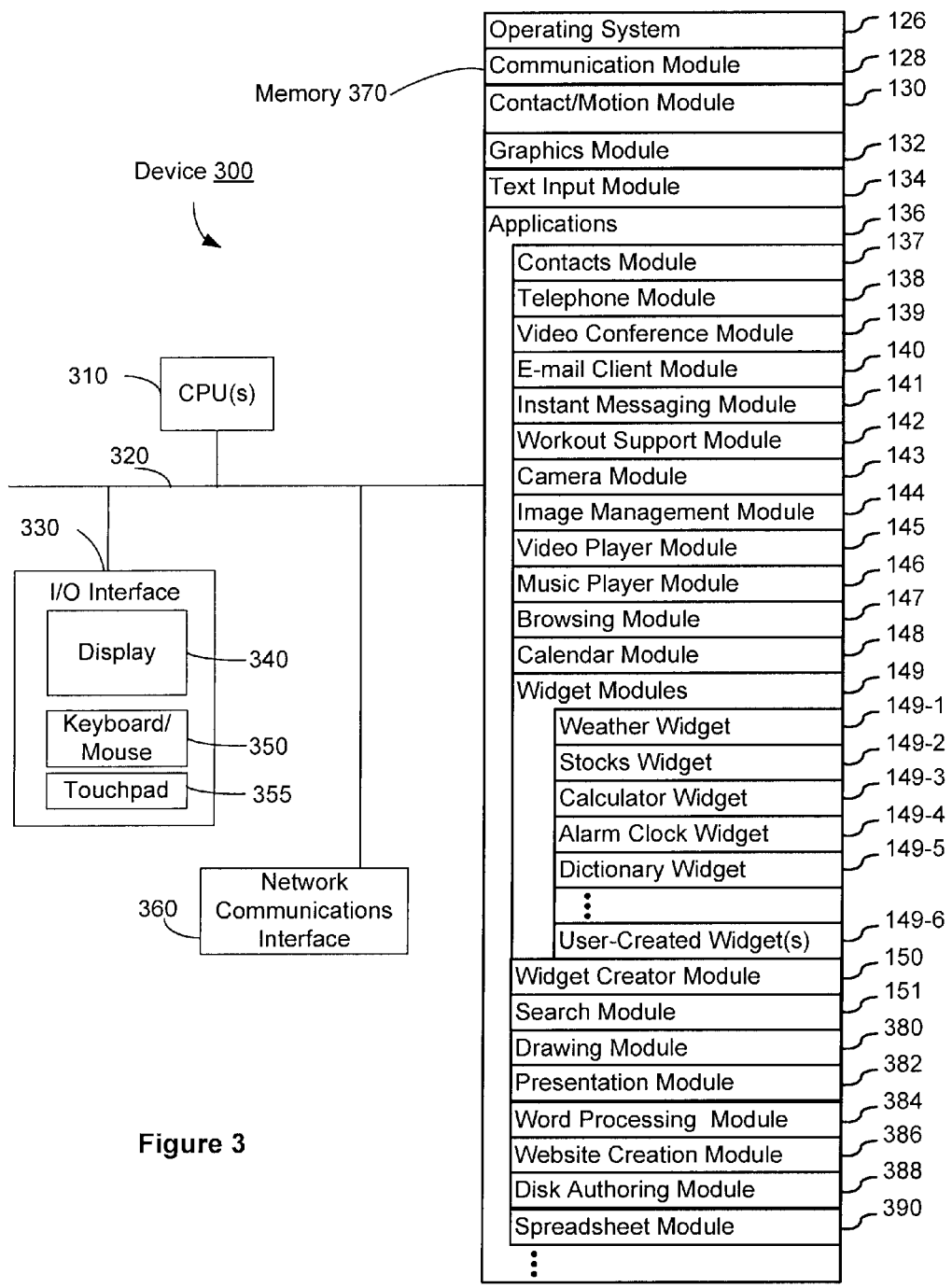
FIG. 3 is a block diagram of an exemplary multifunction device with a display and a touch-sensitive surface in accordance with some embodiments.

FIG. 3 is a block diagram of an exemplary multifunction device with a display and a touch-sensitive surface in accordance with some embodiments. Device 300 need not be portable. In some embodiments, the device 300 is a laptop computer, a desktop computer, a tablet computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes a user interface 330 comprising a display 340, which is typically a touch screen display. The user interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
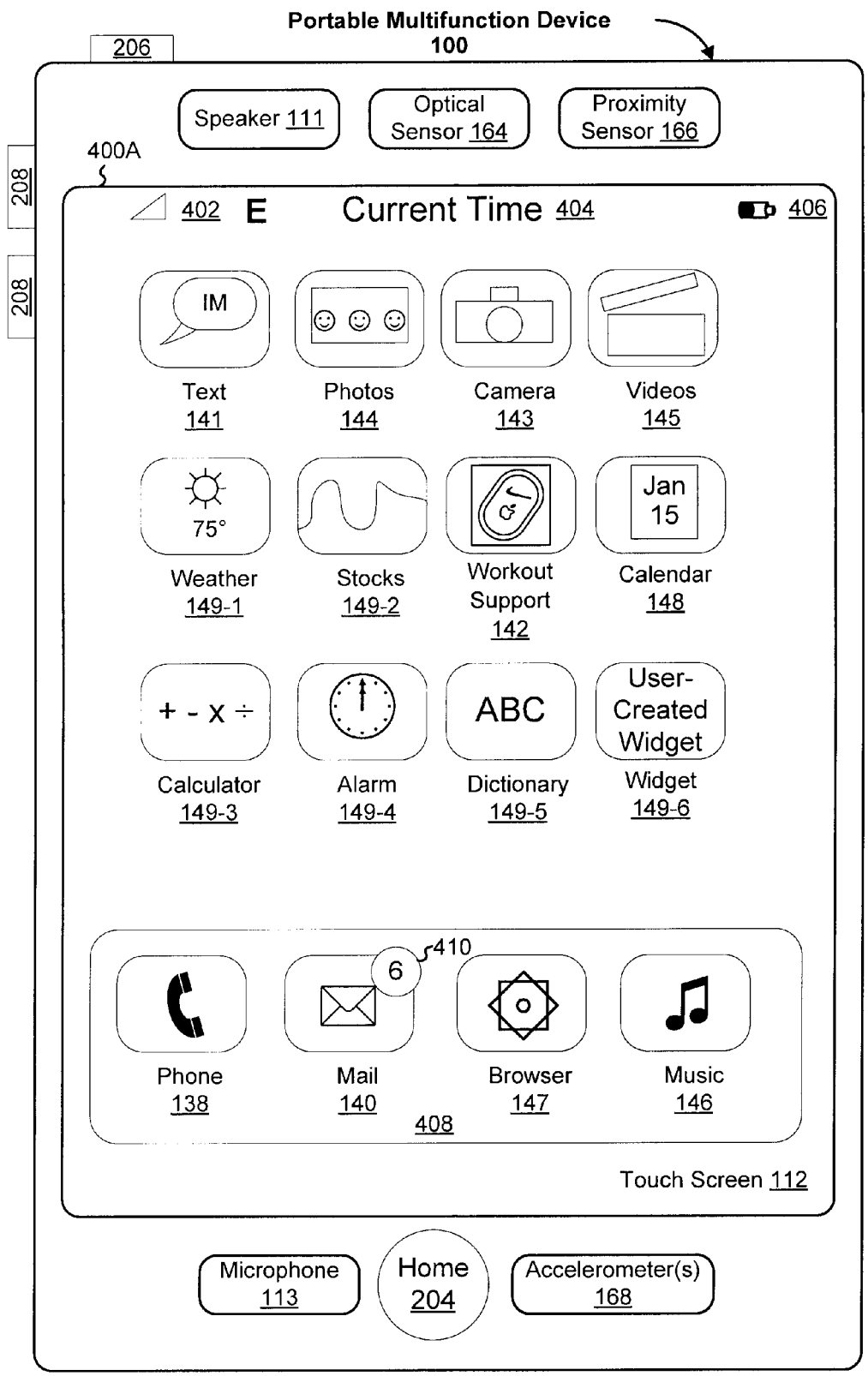
FIGS. 4A and 4B illustrate exemplary user interfaces for a menu of applications on a portable multifunction device in accordance with some embodiments.
Figure 4B:
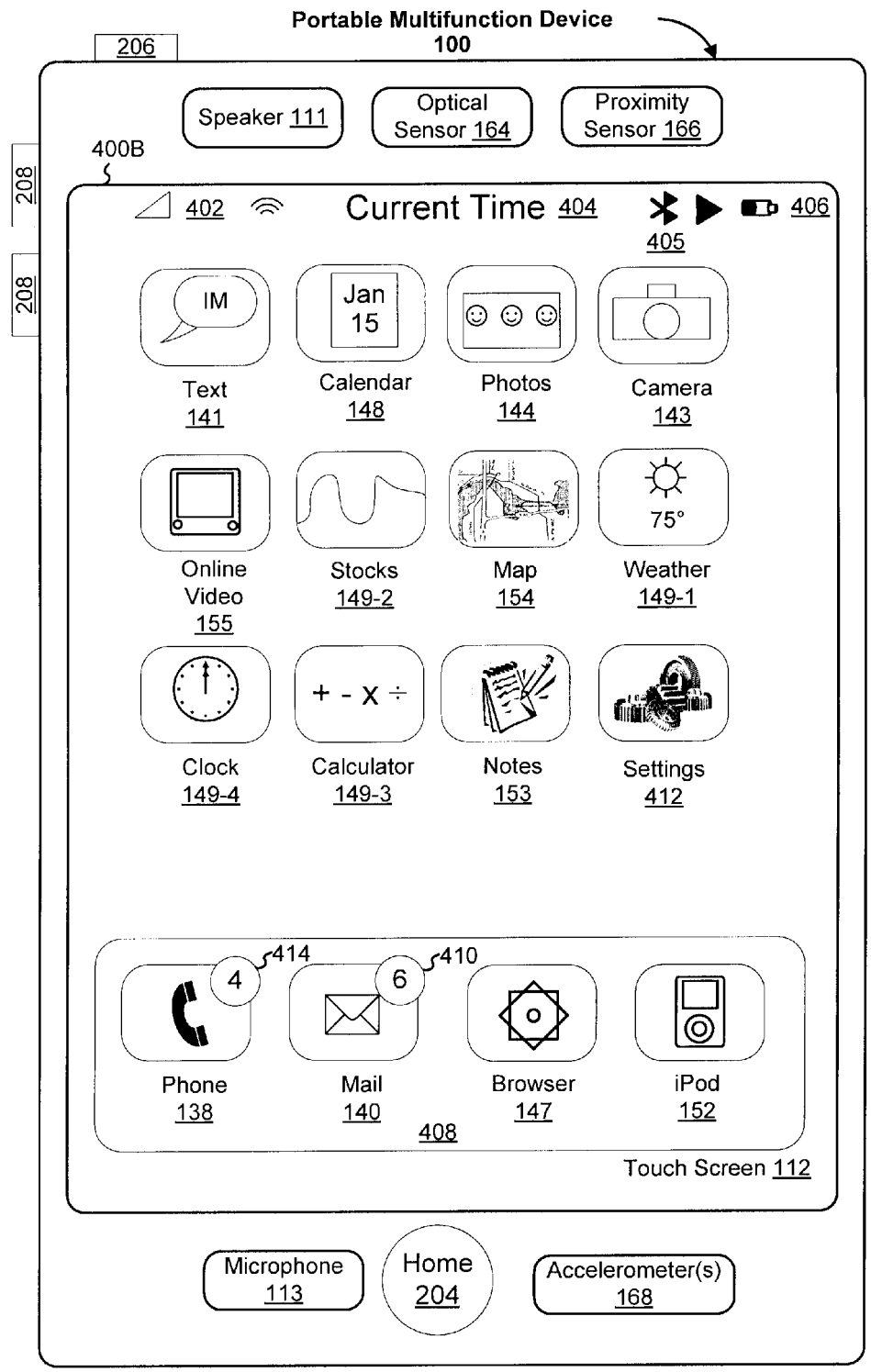

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
  402, 404, 405, 406, 141, 148, 144, 143, 149-3, 149-2, 149-1, 149-4, 410, 414, 138, 140, and 147, as described above;
  Map 154;
  Notes 153;
  Settings 412, which provides access to settings for the device 100 and its various applications 136, as described further below;
  Video and music player module 152, also referred to as iPod (trademark of Apple, Inc.) module 152; and Online video module 155, also referred to as YouTube (trademark of Google, Inc.) module 155.

Figure 4C:
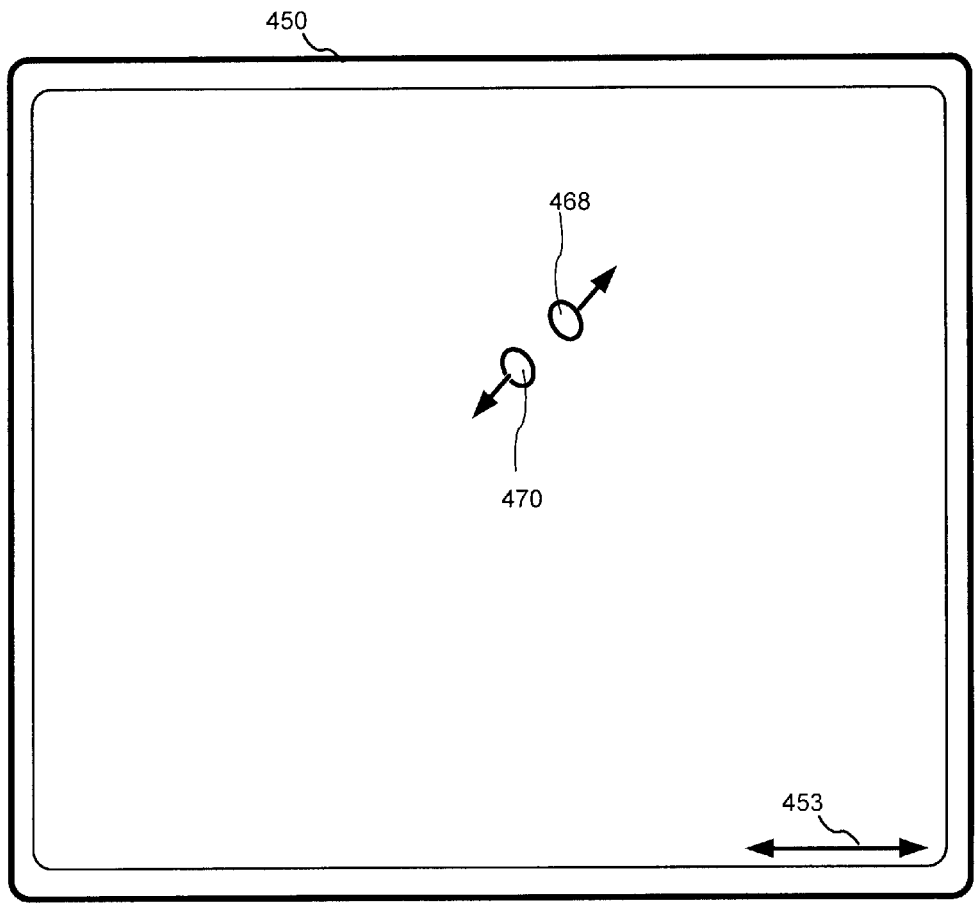
FIG. 4C illustrates an exemplary user interface for a multifunction device with a touch-sensitive surface that is separate from the display in accordance with some embodiments.
Figure 4C:
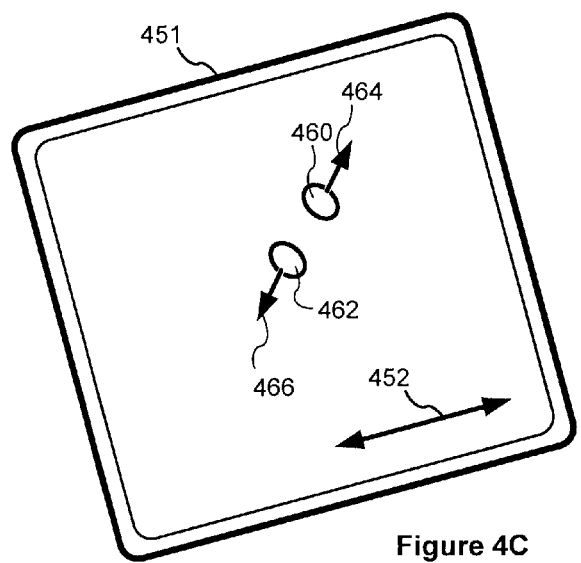

FIG. 4C illustrates an exemplary user interface on a multifunction device with a separate display (e.g., 450) and touch-sensitive surface (e.g., 451). Although many of the examples which follow will be given with reference to a touch screen display (e.g., where the touch sensitive surface and the display are combined, as shown in device 100 in FIGS. 4A-4B), in some embodiments the display and the touch-sensitive surface are separate, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462 in directions 464 and 466, respectively) detected by the device on the touch-sensitive surface (e.g., 451 in FIG. 4C) are used by the device to manipulate the user interface on the display (e.g., 450 in FIG. 4C) of the multifunction device when the touch-sensitive surface and the display are separate. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

Figure 5B:
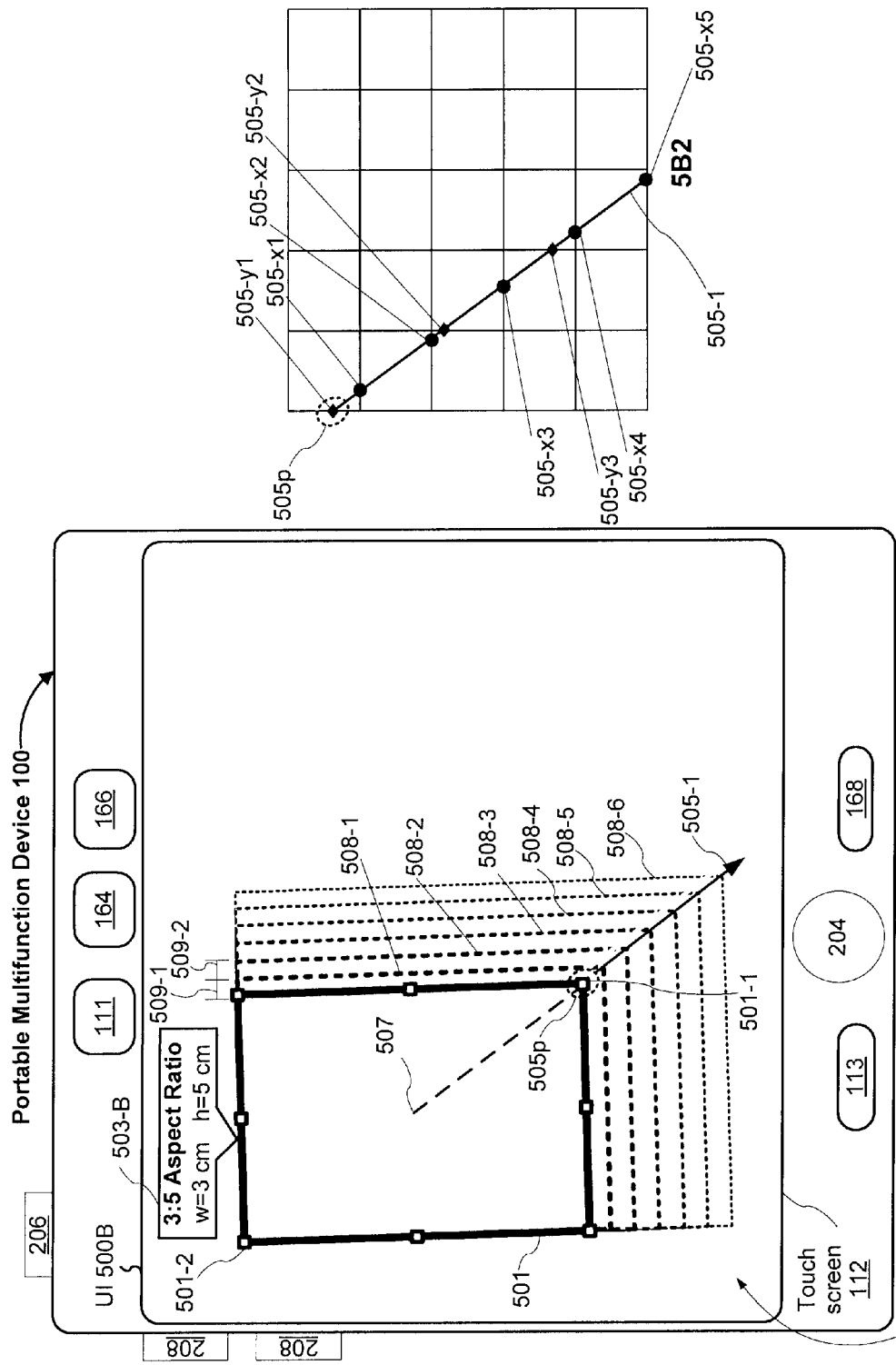
FIGS. 5A-5Q illustrate exemplary user interfaces for manipulating user interface objects in accordance with some embodiments.
Figure 5C:
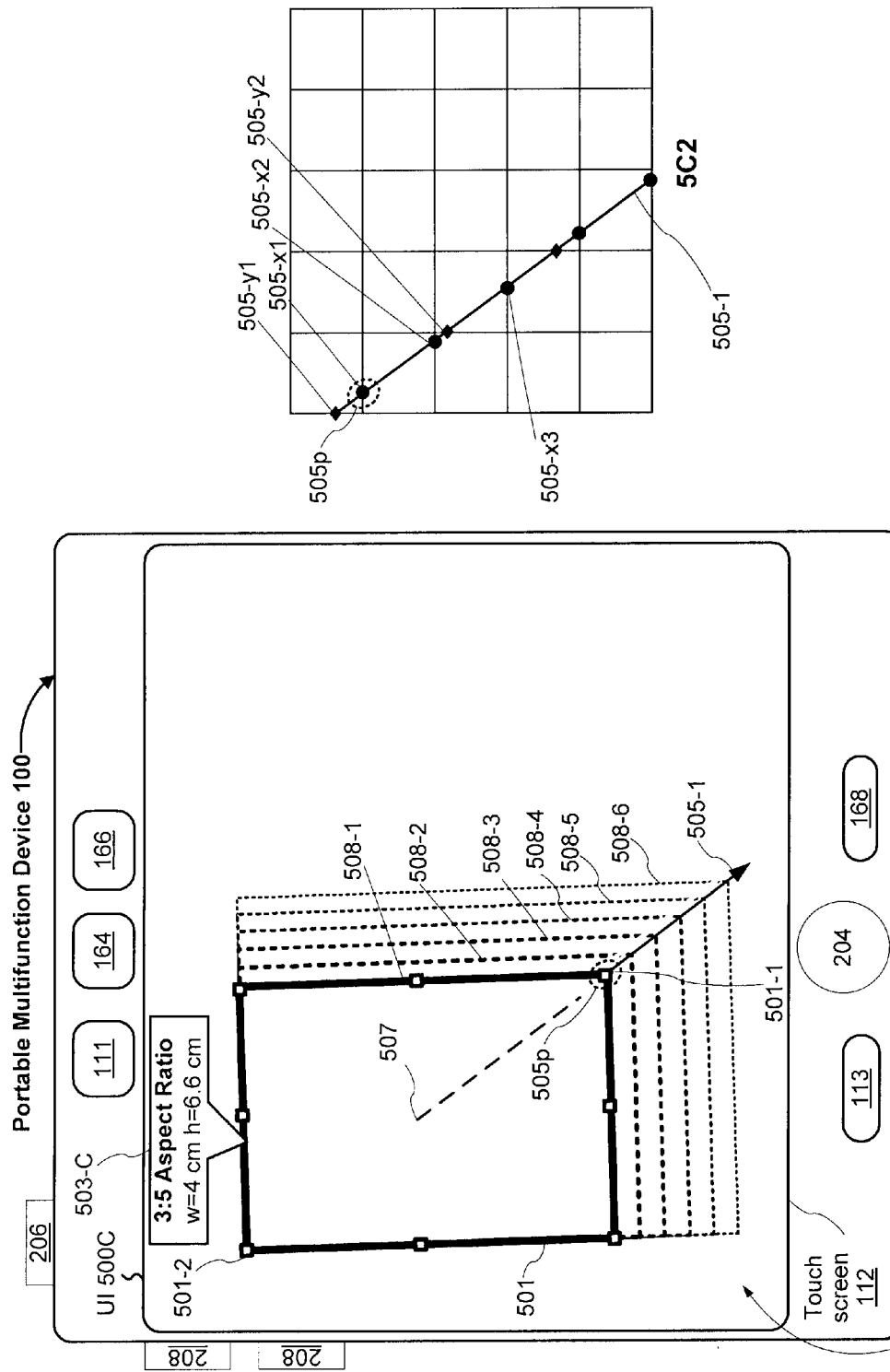
Figure 5D:
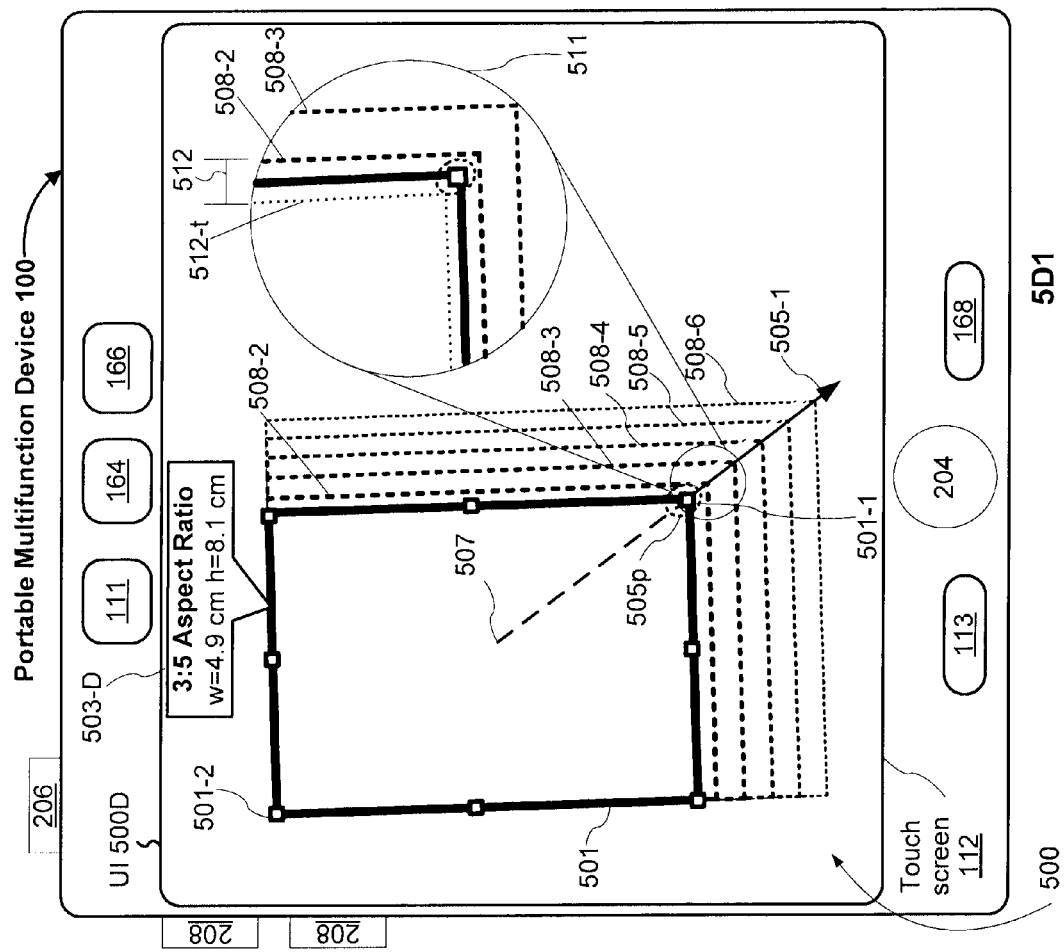
Figure 5D:
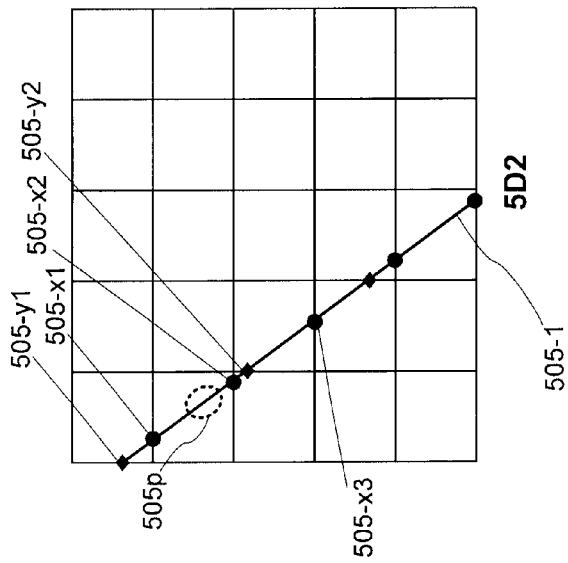
Figure 5E:
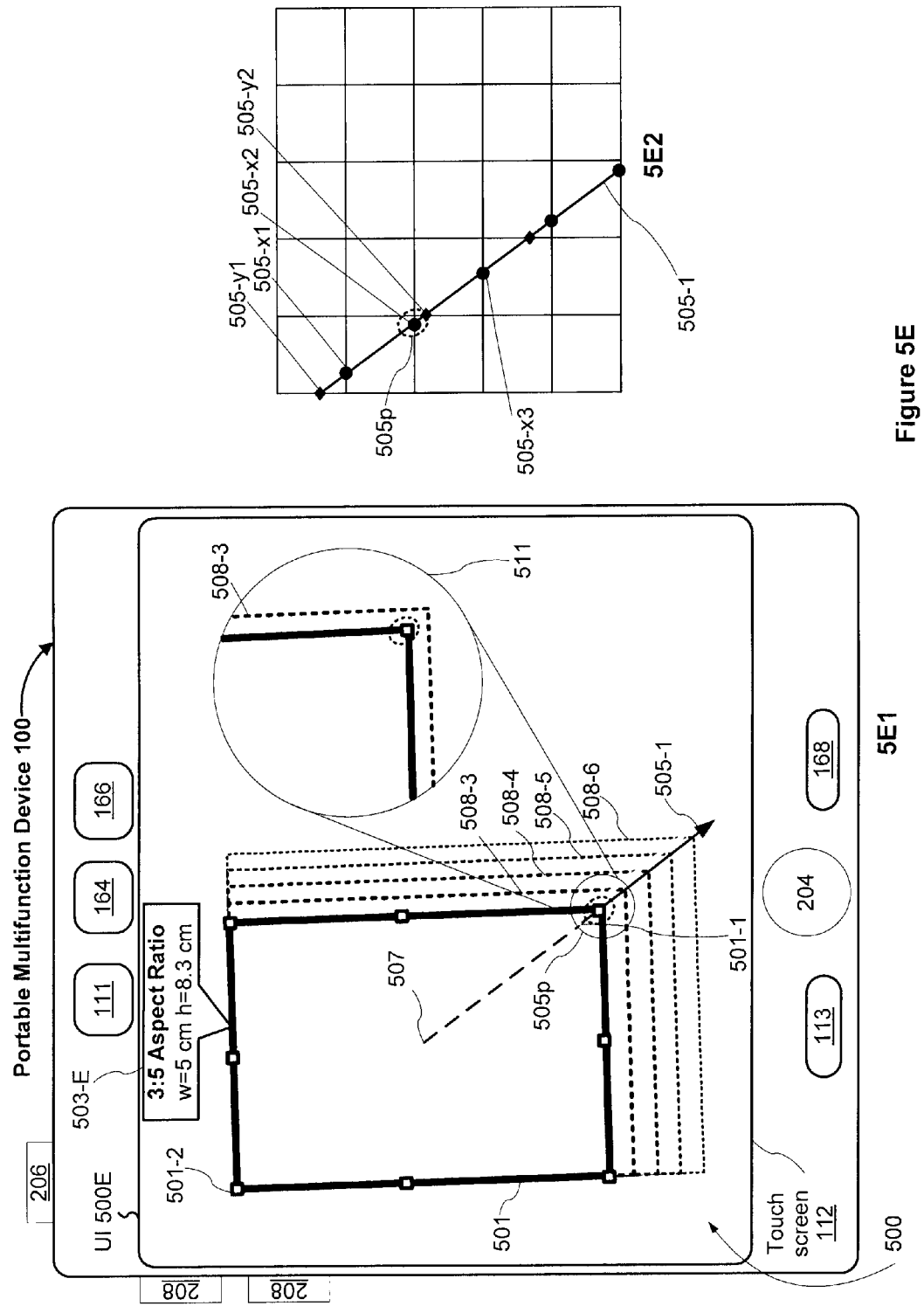
Figure 5F:
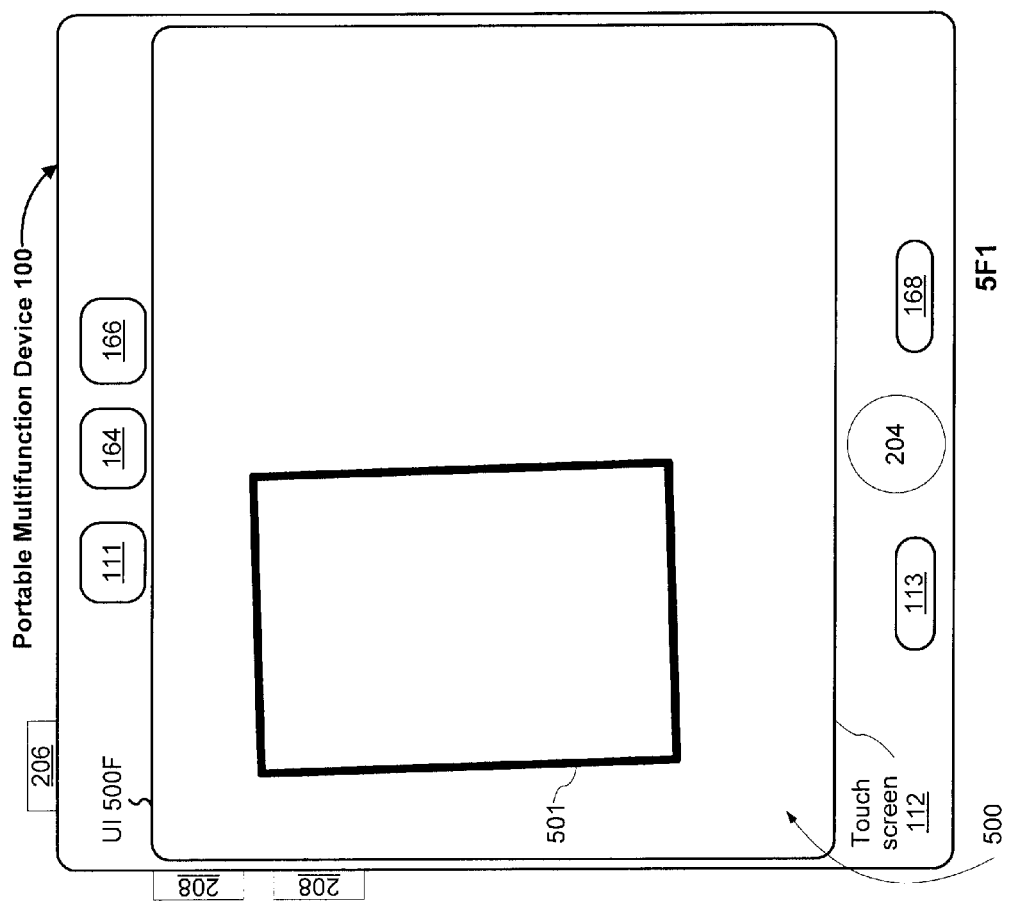
Figure 5G:
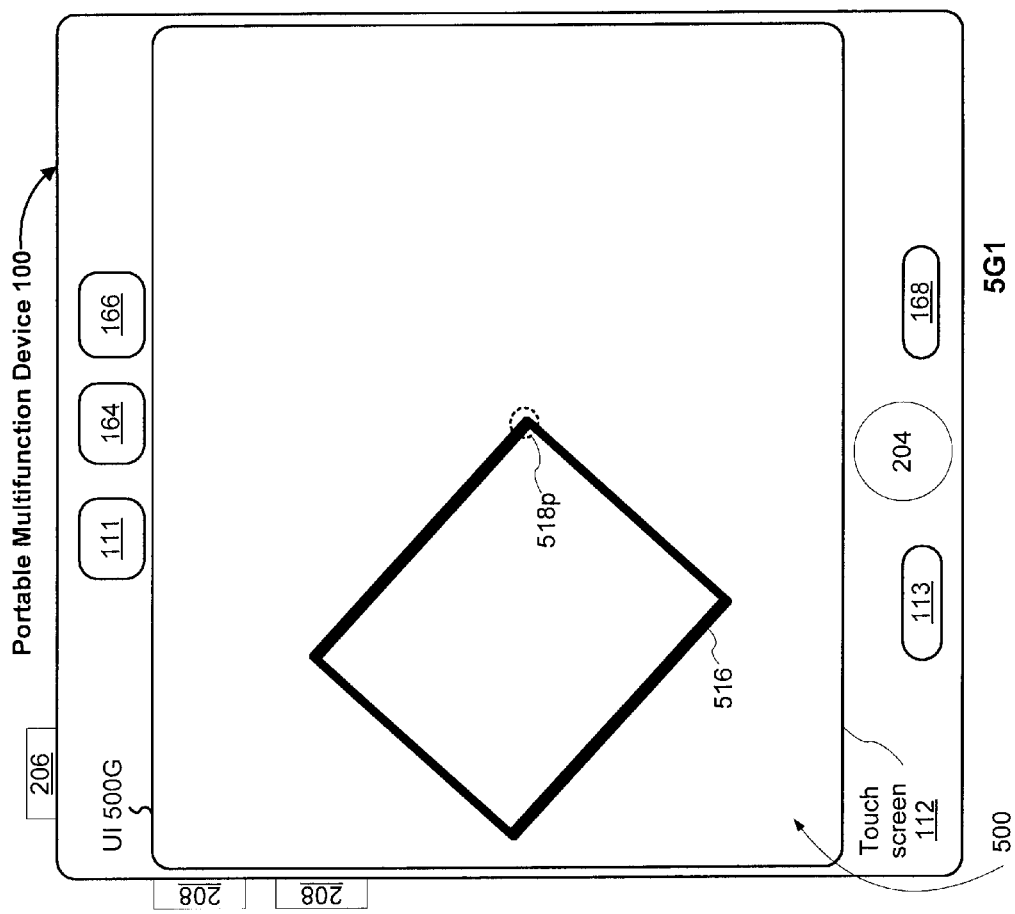
Figure 5H:
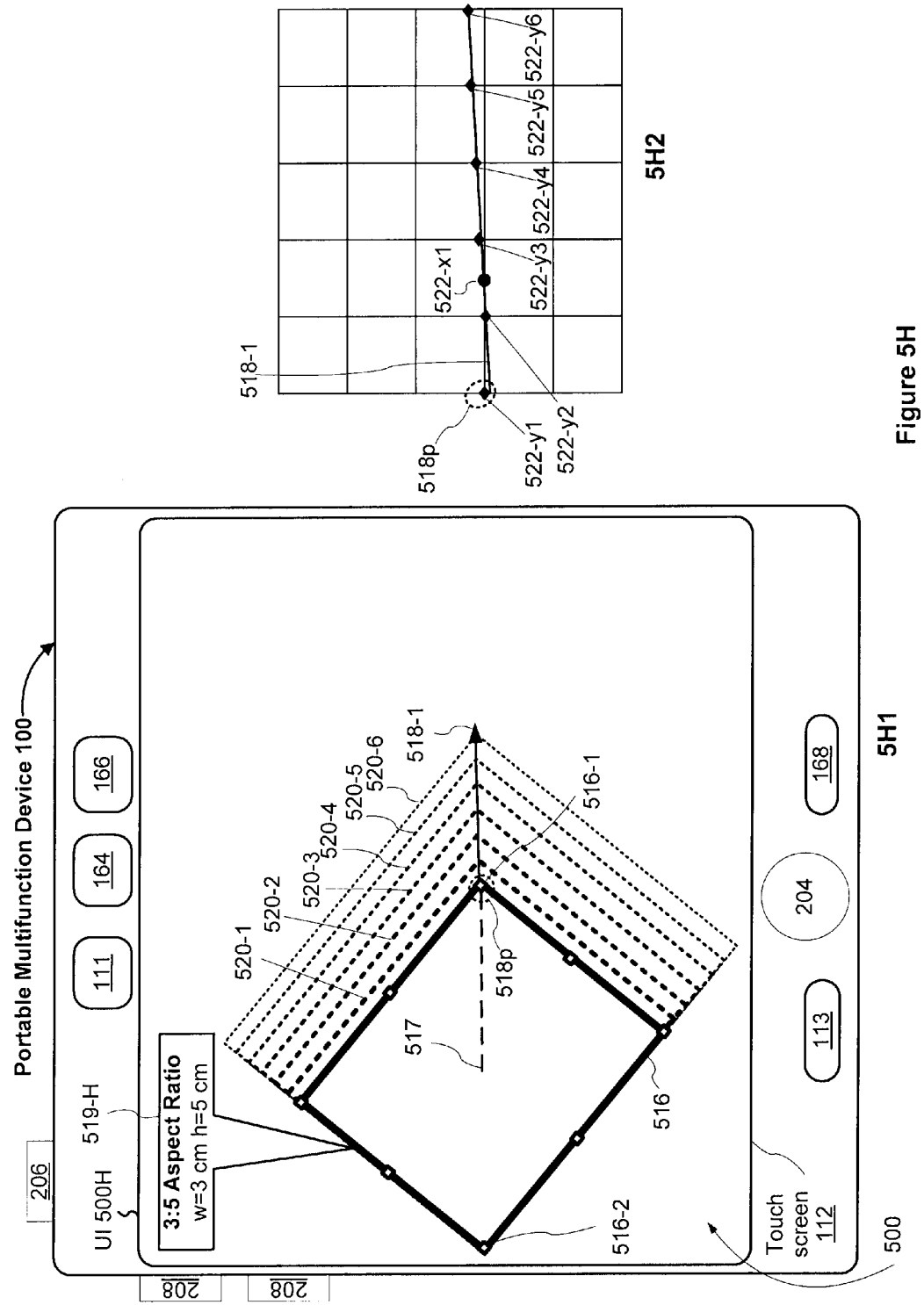
Figure 5I:
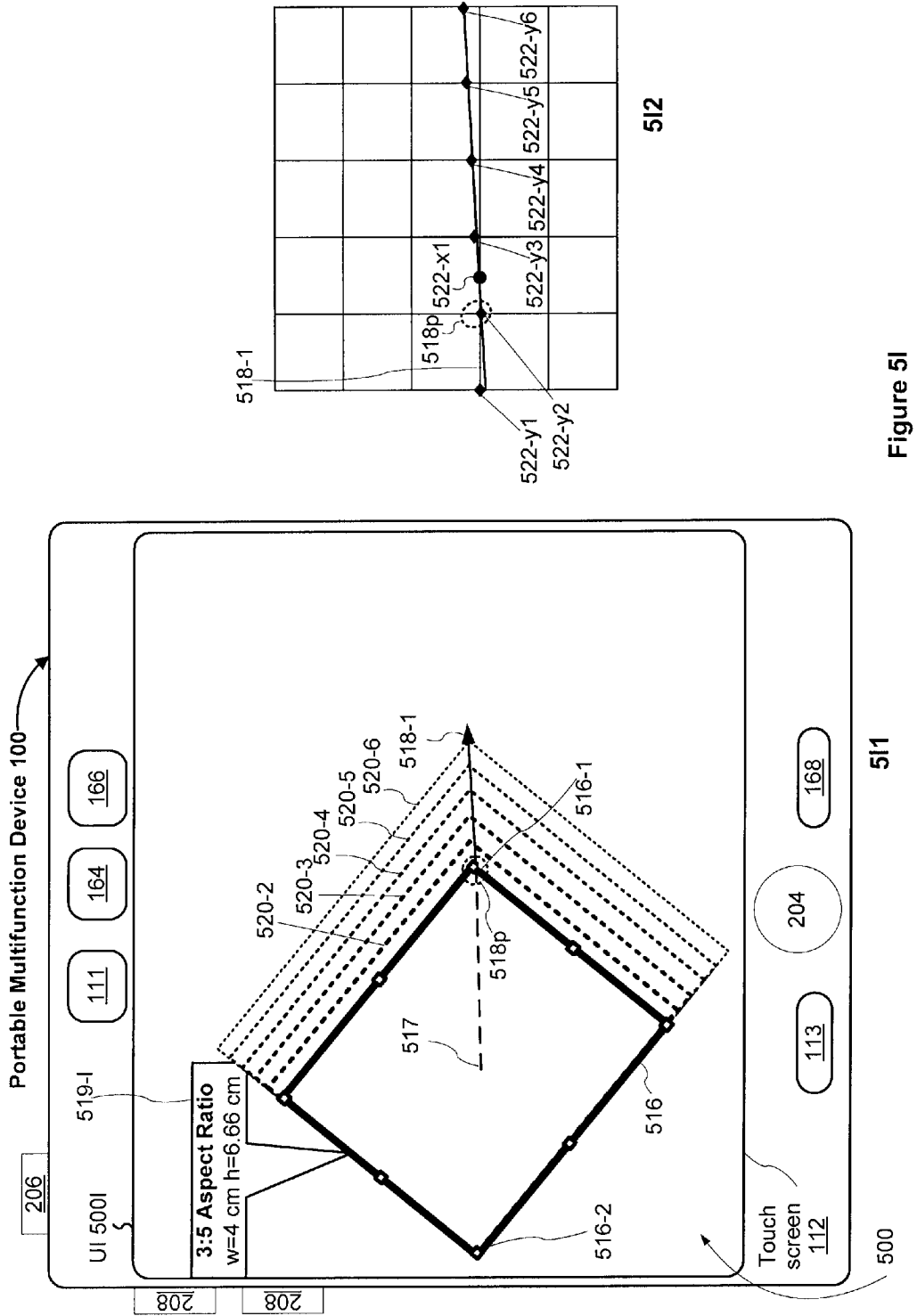
Figure 5J:
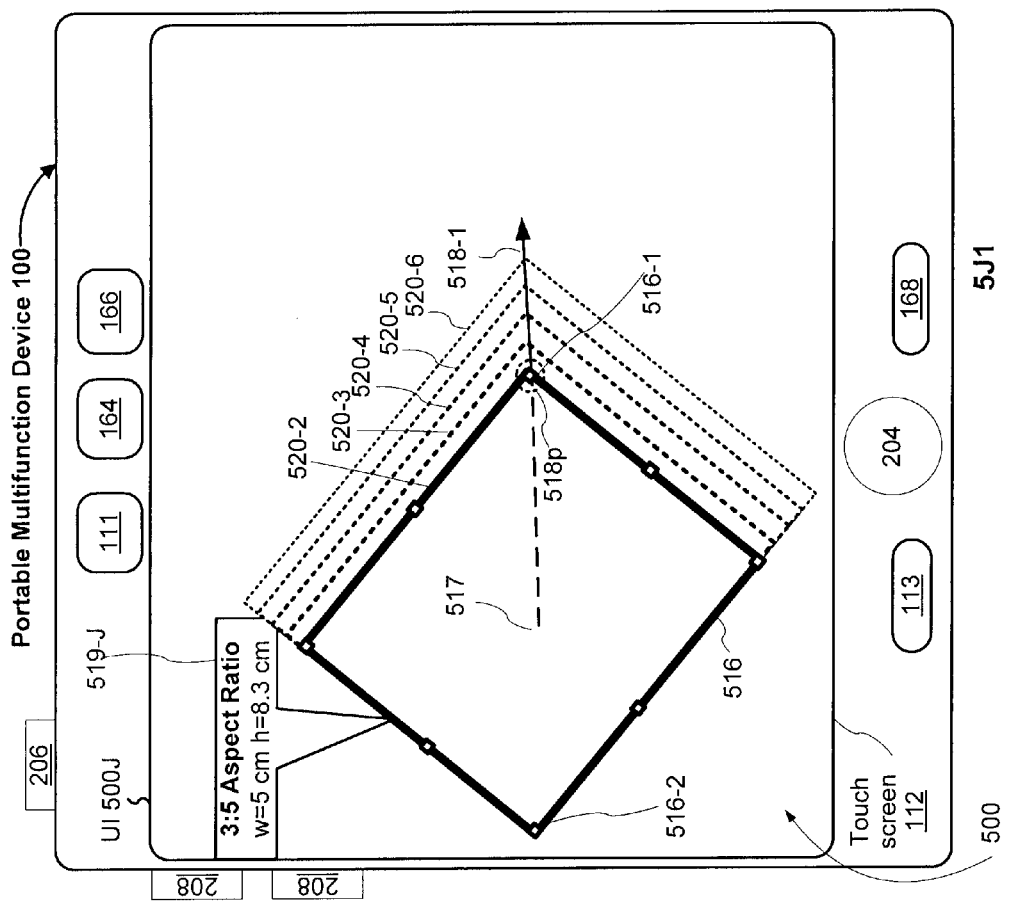
Figure 5K:
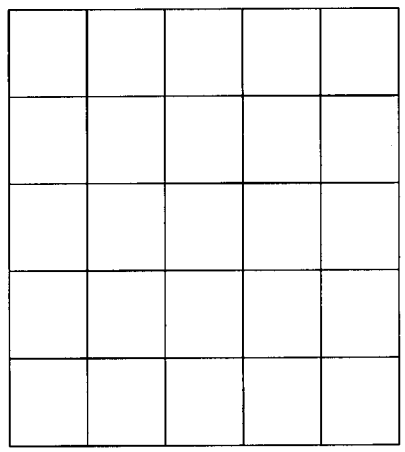
Figure 5K:
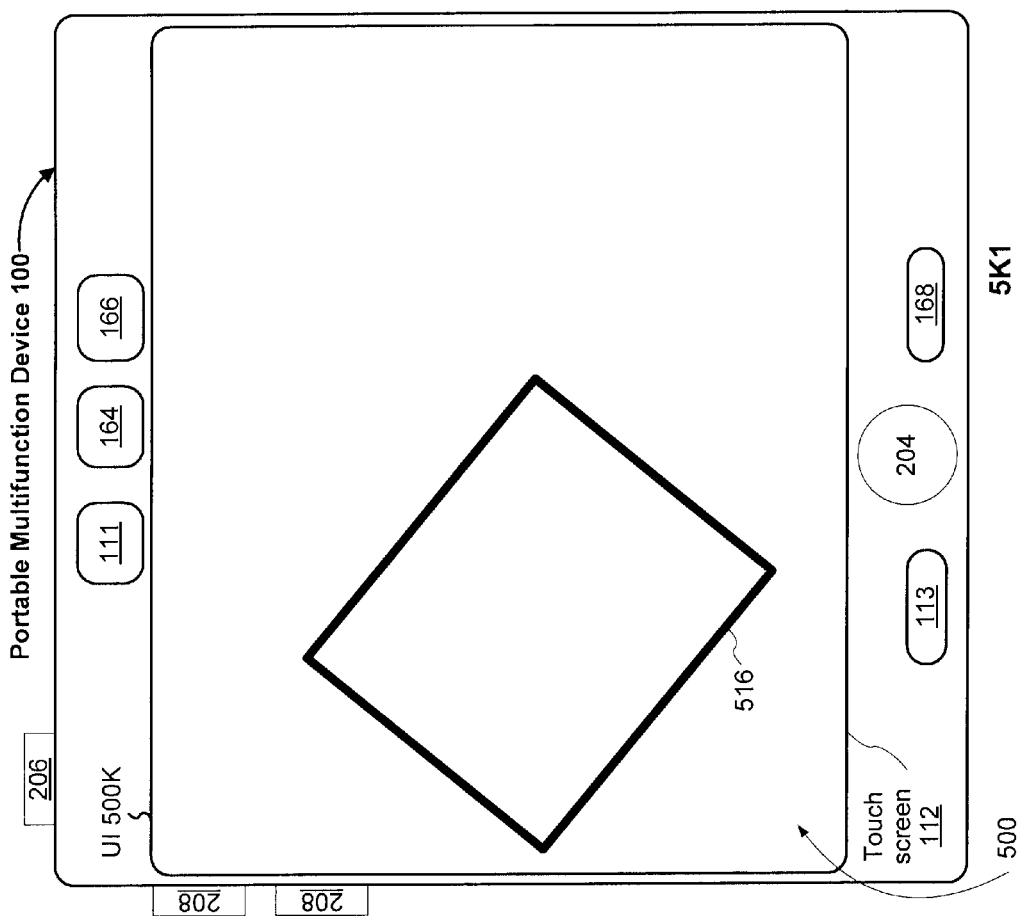
Figure 5L:
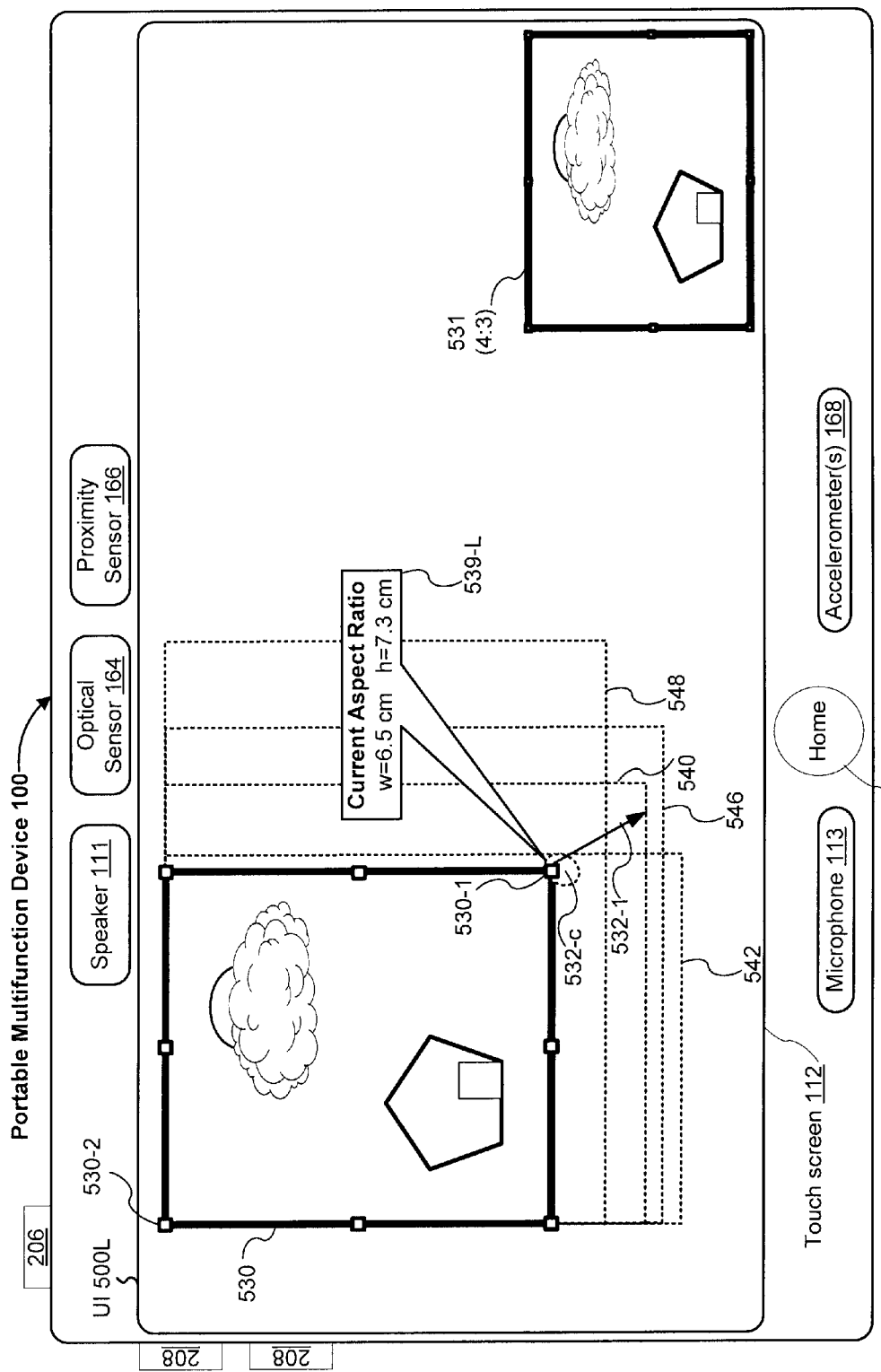
Figure 5M:
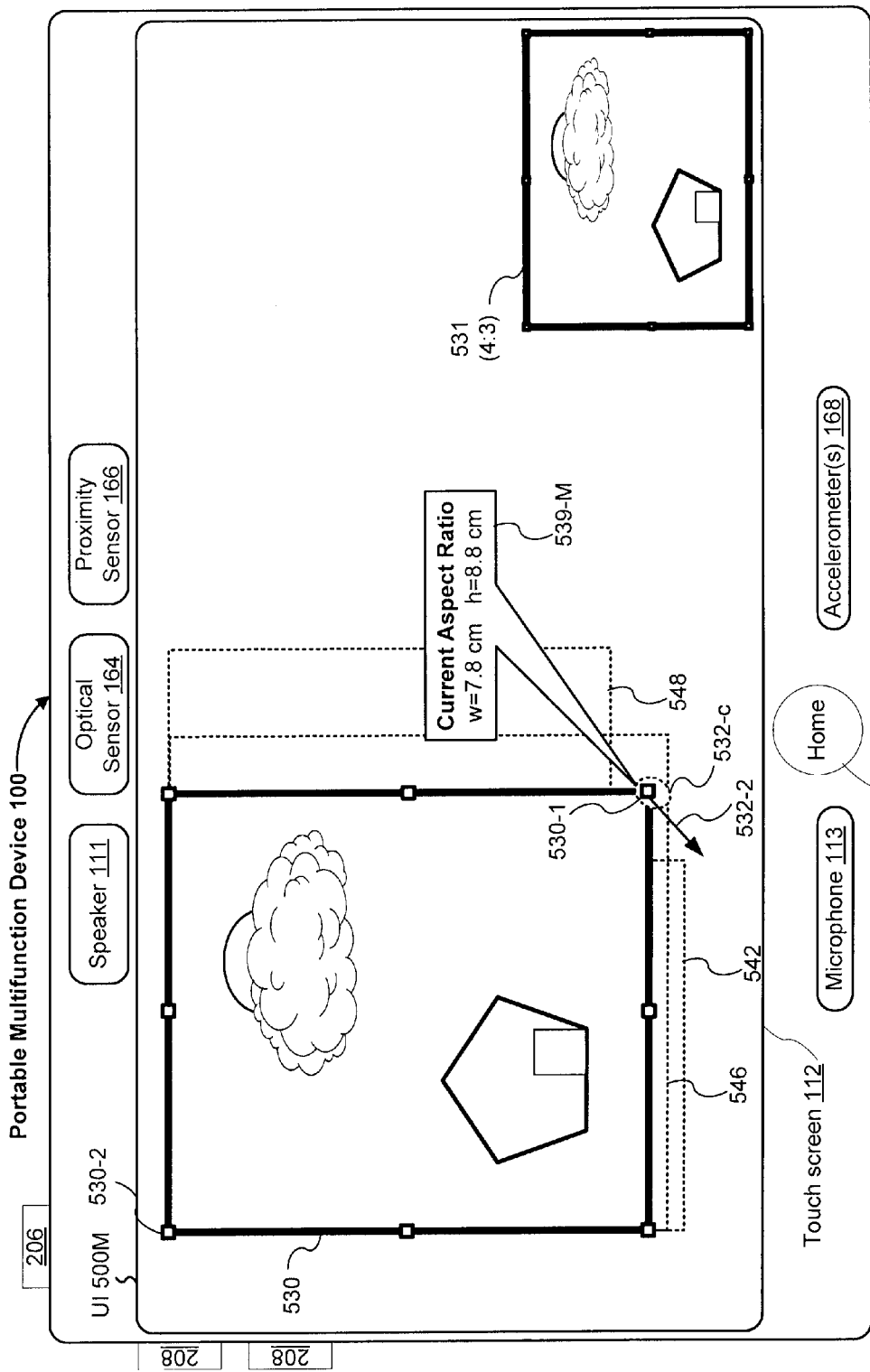
Figure 5N:
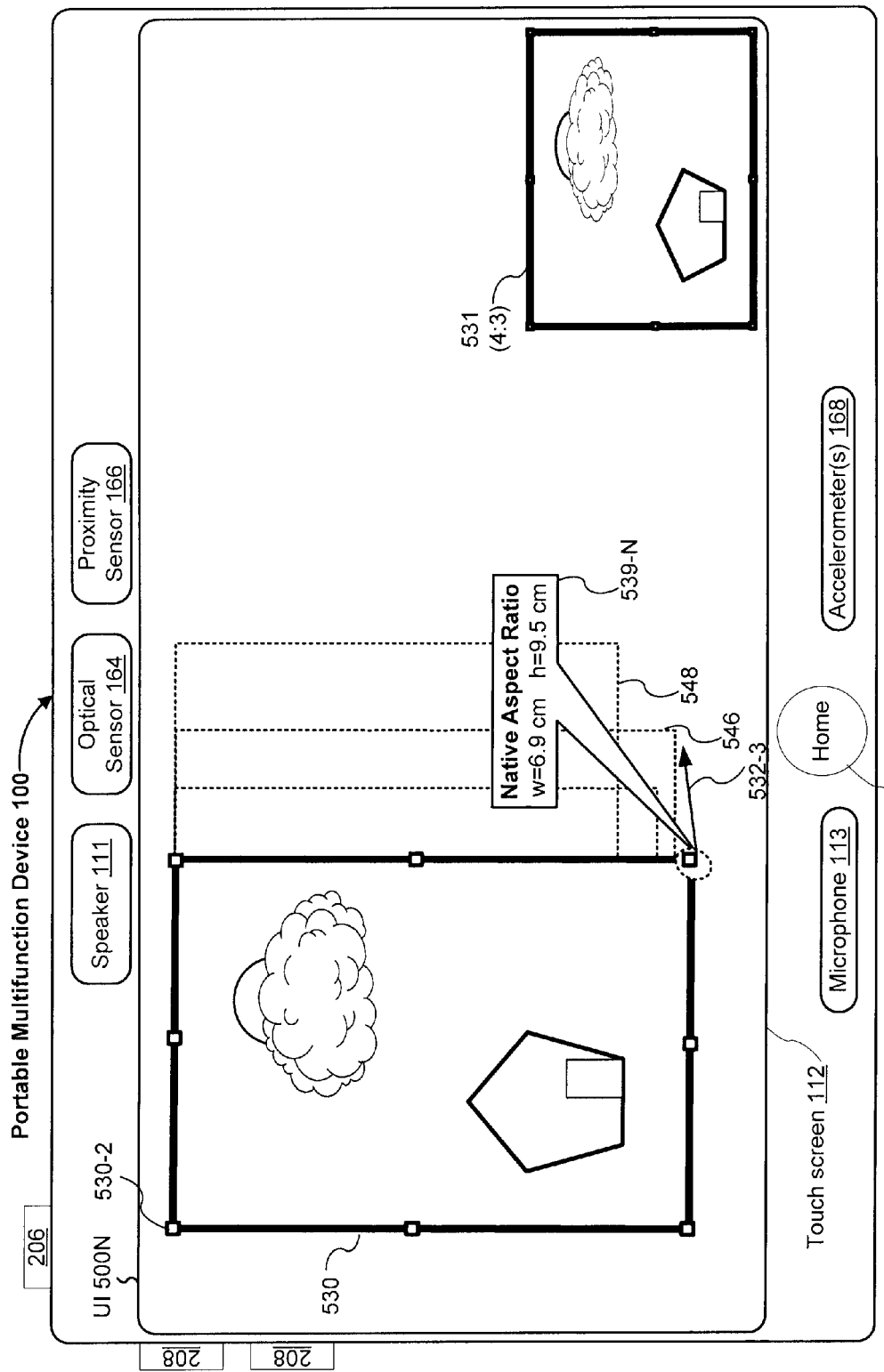
Figure 5O:
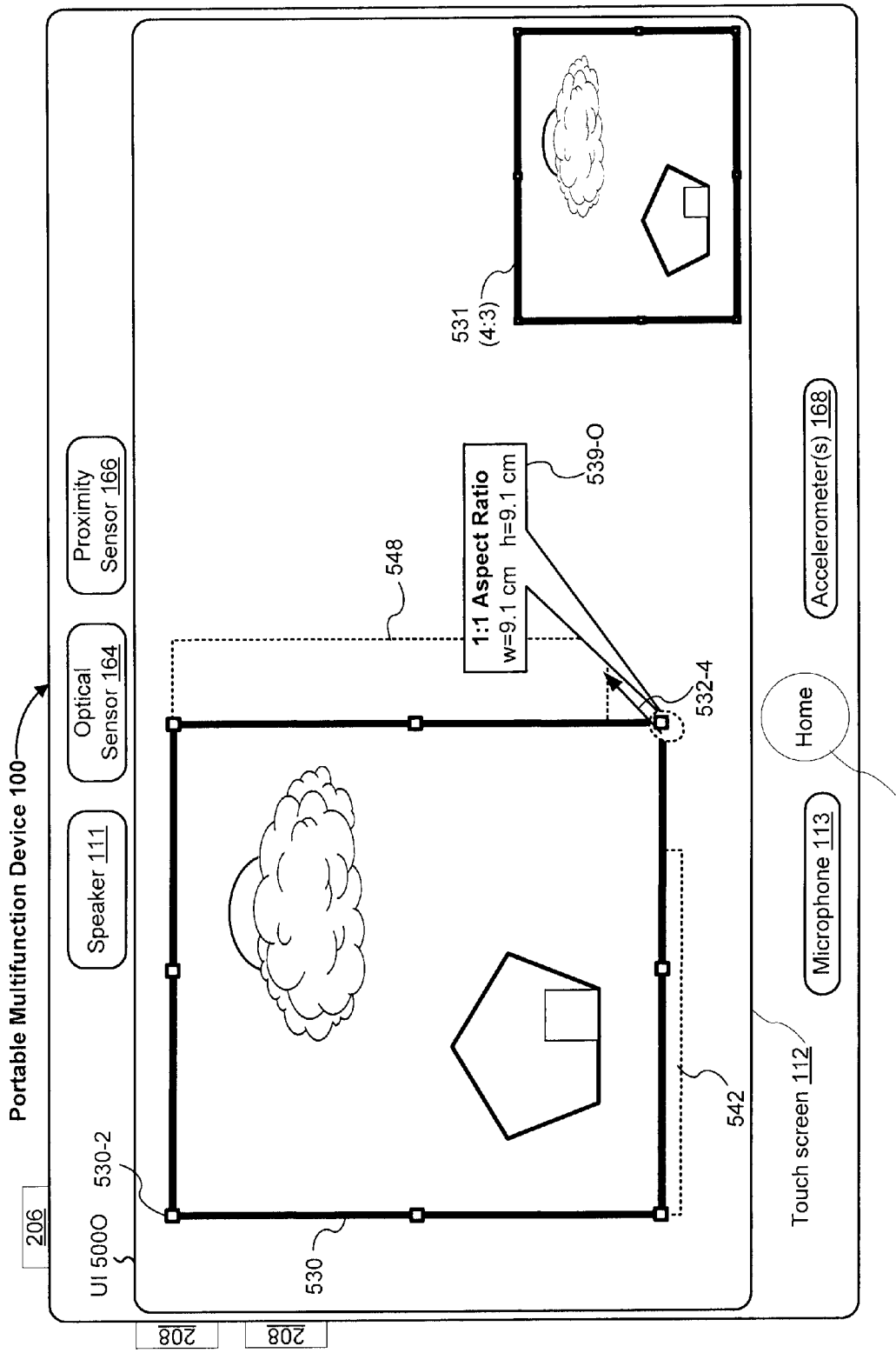
Figure 5P:
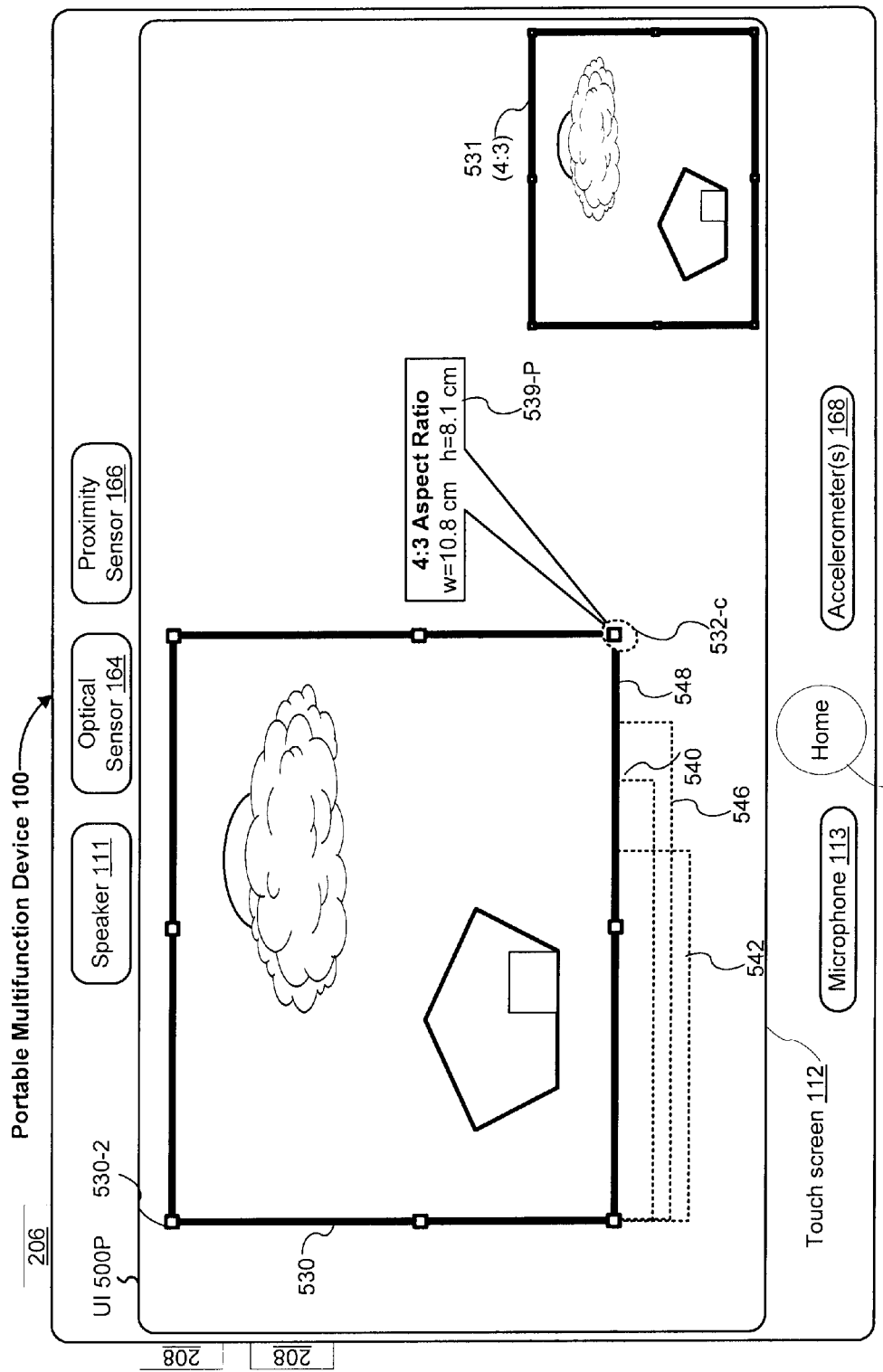
Figure 5Q:
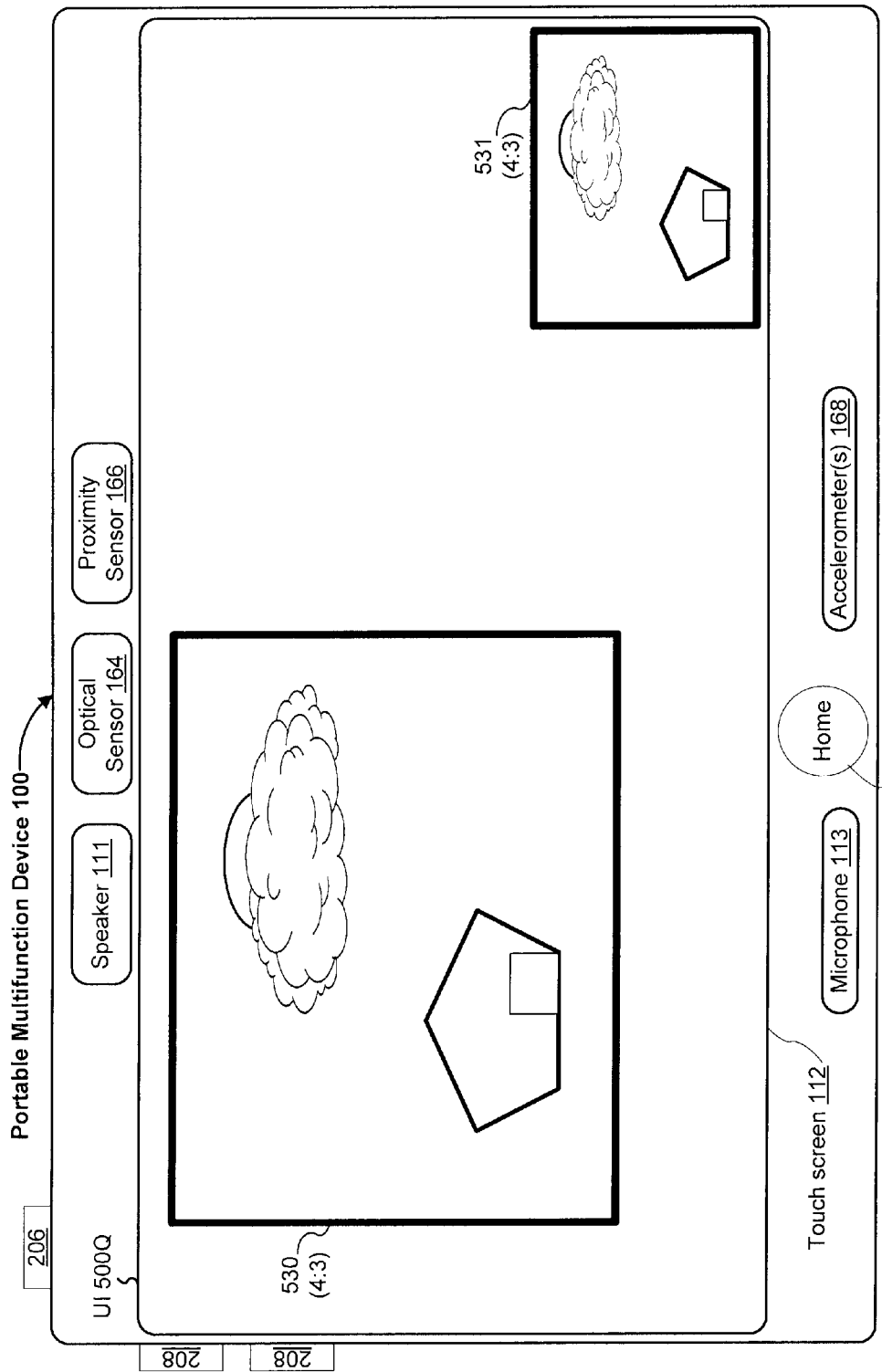

FIGS. 5A-5Q illustrate exemplary user interfaces for managing user interface content and user interface elements while resizing user interface content and user interface elements in accordance with some embodiments. The user interfaces in these figures are used to illustrate the processes described below, including the processes in FIGS. 6A-6C.

In FIGS. 5A-5Q any values, such as the dimensions or aspect ratio of user interface elements, are provided solely for purposes of illustration. Further, the values may not be to scale, and scale may vary from figure to figure. While sizes are expressed in units of centimeters in FIGS. 5A-5Q, any suitable unit type may be used in alternate embodiments.

Each of FIGS. 5A-5K include two sections, which illustrate a portable multifunction device 100 displaying a user interface with an electronic canvas that includes the display of a user interface element, which in these examples are resizable rectangles. The portable multifunction device 100 is displayed in the figures as 5'$n$'1, where '$n$'=the figure letter in the series, e.g., FIG. 5B contains a depiction of portable multifunction device 100 as 5B1.

For clarity in the figures, respective gridlines are not displayed on the electronic canvas in the figures in 5$n$1, though in some embodiments, gridlines may be displayed directly on the canvas. A representation of exemplary gridlines associated with the electronic canvas is provided in the charts 5'$n$'2, where '$n$'=the figure letter in the series, e.g., FIG. 5B contains a depiction of respective gridlines of the electronic canvas as 5B2. To give more context in the examples discussed here, respective gesture path marks representing detected user gestures to resize the user interface element are overlaid on the exemplary gridlines in 5$n$2. Thus, the figures in 5$n$1 and 5$n$2 present a synchronized view of resizing a user interface element on touch screen 112 and the conceptual representation of resizing that same user interface element with respect to the electronic canvas's gridlines. FIG. 5A depicts an exemplary user interface displayed on device 100 within user interface UI 500A (section 5A1 of FIG. 5A). In this example, the user interface includes the display of an electronic canvas 500, on which rectangle 501 is displayed at a slightly oblique angle. The device detects point of contact 505$p$ over rectangle 501 in 5A1. As there is no directional path associated with point of contact 505$p$ in FIG. 5A, no corresponding gesture path mark is displayed in chart 5A2.

FIG. 5B illustrates an exemplary affordance 503-B displayed within user interface UI 500B (section 5B1 of FIG. 5B). Affordance 503-B is displayed in conjunction with user interface object 501. In this example, affordance 503-B is configured to display both the current size and the current aspect ratio of user interface object 501. UI 500B also illustrates that after point of contact 505$p$ was detected in 5A1, resize handles are displayed for rectangle 501, including first resize handle 501-1 and second resize handle 501-2, which are on opposite corners of rectangle 501. Note that in this example, point of contact 505$p$ is at a location corresponding to first resize handle 501-1.

UI 500B also illustrates user gesture 505, which includes a directional path 505-1. Chart 5B2 includes a representation of point of contact 505$p$ and directional path 505-1, which crosses respective x-axis gridlines 505-$x$1, 505-$x$2, 505-$x$3, 505-$x$4, and 505-$x$5, as well as respective y-axis gridlines 505-$y$1, 505-$y$2, and 505-$y$3. Accordingly, in this example, directional path 505-1 crosses more respective x-axis gridlines than respective y-axis gridlines.

UI 500B also illustrates that within rectangle 501, diagonal axis 507 is depicted, and extends from the interior of rectangle 501 through first resize handle 501-1, and corresponds to the directional path 505-1 as well as extending through exemplary resize snap locations represented by snap lines 508-1 through 508-6 (which may be displayed visibly in some embodiments, and not displayed visibly in other embodiments).

UI 500B also depicts exemplary quantized distance multiples 509-1 and 509-2. In these examples, quantized distance multiples 509-1 and 509-2 correspond to snap lines 508-1 and 508-2, which correspond to respective x-axis gridlines in chart 5B2.

FIG. 5C depicts that in response to user gesture 505 in UI 500B, rectangle 501 has been snapped to snap line 508-1 (section 5C1 of FIG. 5C). Affordance 503-C has been updated to display both the current size and the current aspect ratio of user interface object 501. Specifically, in this example, rectangle 501 has been snapped to snap line 508-1, and as indicated by affordance 503-C, the width of rectangle 501 is now 4 cm, while the height is 6.6 cm. Thus, the aspect ratio of rectangle 501 has been maintained at a 3:5 aspect ratio.

Chart 5C2 illustrates the corresponding location of point of contact 505$p$ in relation to directional path 505-1 of user gesture 505, where the current location is at x-axis gridline 505-*x*1. This example illustrates that when rectangle 501 was snapped to snap line 508-1 in 5C1, the snapping was to a respective x-axis gridline, i.e. 505-*x*1.

Further, as indicated by chart 5C2, rectangle 501 is being snapped to x-axis gridlines, which are separated by quantized distance multiples 509 (as depicted in UI 500B). Thus, though the size changes in the x-direction (or width in this example) are fixed by the quantized distance multiple, a y-axis size adjustment (or height in this example) to the user interface element is derived to maintain the aspect ratio of the user interface element. Here, once rectangle 501 is snapped to 4 cm width (x-axis size), the height of rectangle 501 is derived, namely 6.6 cm height (y-axis size).

FIG. 5D illustrates the continuation of exemplary user gesture 505, which includes the directional path 505-1 within UI 500D (5D1 in FIG. 5D), and chart 5D2 shows the corresponding directional path 505-1 superimposed on respective gridlines. Exemplary affordance 503-D has been updated to reflect the size increase of rectangle 501 due to user gesture 505. Rectangle 501 is now at 4.9 cm width and 8.1 cm height, while maintaining the 3:5 aspect ratio.

For illustrative purposes, magnified region 511 displays a magnified image of the area around rectangle 501 and point of contact 505*p*. Magnified region 511 includes images of snap lines 508-2 and 508-3, as well as predefined distance threshold 512-*t*, which is predefined distance 512 from snap line 508-2. Note that rectangle 501 is less than predefined distance 512 from snap line 508-2.

FIG. 5E illustrates the continuation of exemplary user gesture 505, which includes the directional path 505-1 within UI 500E (5E1 in FIG. 5E), and chart 5E2 shows the corresponding directional path 505-1 superimposed on respective gridlines. Exemplary affordance 503-E has been updated to reflect the size increase of rectangle 501 due to user gesture 505. Rectangle 501 is now at 5 cm width and 8.3 cm height, while maintaining the 3:5 aspect ratio.

Because, as noted above, the directional path 505-1 intersects more x-axis gridlines than y-axis gridlines (illustrated in chart 5E2), the device snapped rectangle 501 to snap line 508-2 since the perimeter of rectangle 501 was closer to snap line 508-2 than predefined distance threshold 512-*t*.

Though not explicitly depicted, point of contact 505*p* is lifted off touch screen 112 in UI 500E, so in FIG. 5F, the snap lines 508, gesture 505, resize handles 501-1 and 501-2, and affordance 503 are no longer displayed in UI 500F (5F1 in FIG. 5F). As there is no detected gesture in UI 500F, no corresponding gesture path mark is displayed in chart 5F2.

FIGS. 5G-5K illustrate resizing another user interface element, rectangle 516.

FIG. 5G depicts an exemplary user interface displayed on device 100 within user interface UI 500G (section 5G1 of FIG. 5G). In this example, the user interface includes the display of an electronic canvas 500, on which rectangle 516 is displayed at an oblique angle. The device detects point of contact 518*p* over rectangle 516 in 5G1. As there is no directional path associated with point of contact 518*p* in FIG. 5G, no corresponding gesture path mark is displayed in chart 5G2.

FIG. 5H illustrates an exemplary affordance 503-H displayed within user interface UI 500H (section 5H1 of FIG. 5H). Affordance 519-H is displayed in conjunction with user interface object 516. In this example, affordance 519-H is configured to display both the current size and the current aspect ratio of user interface object 516. UI 500H also illustrates that after point of contact 518*p* was detected in 5G1, resize handles are displayed for rectangle 516, including first resize handle 516-1 and second resize handle 516-2, which are on opposite corners of rectangle 516. Note that in this example, point of contact 518*p* is at a location corresponding to first resize handle 516-1.

UI 500H also illustrates a user gesture 518 that includes a directional path 518-1. Chart 5H2 includes a representation of point of contact 518*p* and directional path 518-1, which crosses respective x-axis gridline 522-*x*1, as well as respective y-axis gridlines 522-*y*1, 522-*y*2, 522-*y*3, 522-*y*4, 522-*y*5, and 522-*y*6. Accordingly, in this example, directional path 518-1 crosses more respective y-axis gridlines than respective x-axis gridlines.

UI 500H also illustrates that within rectangle 516, diagonal axis 517 is depicted, and extends from the interior of rectangle 516 through first resize handle 516-1, and corresponds to the directional path 518-1 as well as extending through exemplary resize snap locations represented by snap lines 520-1 through 520-6.

FIG. 5I depicts that in response to user gesture 518 in UI 500H, rectangle 501 has been snapped to snap line 520-1 (section 5I1 of FIG. 5I). Affordance 519-I has been updated to display both the current size and the current aspect ratio of user interface object 501. Specifically, in this example, rectangle 516 has been snapped to snap line 520-1, and as indicated by affordance 519-I, the width of rectangle 516 is now 4 cm, while the height is 6.6 cm. Thus, the aspect ratio of rectangle 501 has been maintained at a 3:5 aspect ratio.

Chart 5I2 illustrates the corresponding location of point of contact 518*p* in relation to directional path 518-1 of user gesture 518, where the current location is at y-axis gridline 522-*y*2. This example illustrates that when rectangle 516 was snapped to snap line 520-1 in 5I1, the snapping was to a respective y-axis gridline, i.e. 522-*y*1, because the directional path 518-1 crosses more y-axis gridlines than x-axis gridlines. Thus, though the depicted size changes in the y-direction are of evenly spaced distances, 1 cm in this particular example, an x-axis size adjustment to the user interface element is derived to maintain the aspect ratio of the user interface element. Here, once rectangle 516 is snapped to 4 cm width, the height of rectangle 516 is derived, namely 6.6 cm height.

FIG. 5J illustrates the continuation of exemplary user gesture 518, which includes the directional path 518-1 within UI 500J (5J1 in FIG. 5J), and chart 5J2 shows the corresponding directional path 518-1 superimposed on respective gridlines. Exemplary affordance 519-J has been updated to reflect the size increase of rectangle 516 due to user gesture 518. Rectangle 516 is now at 5 cm width and 8.3 cm height, while maintaining the 3:5 aspect ratio.

Because, as noted above, the directional path 518-1 intersects more y-axis gridlines than x-axis gridlines (illustrated in chart 5J2), the device snapped rectangle 516 to snap line 520-2, corresponding to respective y-axis gridline 522-*y*3, rather than any gridline corresponding to an x-axis gridline, such as 522-*x*1.

Though not explicitly depicted, point of contact 518*p* is lifted off touch screen 112 in UI 500J, so in FIG. 5K, the snap lines 520, gesture 518, resize handles 516-1 and 516-2, and affordance 519 are no longer displayed in UI 500K (5K1 in FIG. 5K). As there is no detected gesture in UI 500K, no corresponding gesture path mark is displayed in chart 5K2.

UI 500L-UI 500Q (FIGS. 5L-5Q) illustrate exemplary user interfaces for snapping user interface elements to adjusted sizes and predetermined aspect ratios in response to detecting user gestures to resize objects.

UI 500L illustrates a detected user gesture 532 including contact 532-*c* and resizing motion 532-1, where contact 532-*c* is at resize handle 530-1 of currently selected user interface object 530. User interface object 530 also has other resize handles, including second resize handle 530-2, which is opposite resize handle 530-1. In the exemplary embodiment of UI 500L, user interface object 530 can be resized to an adjusted size that is different from the initial size of object 530. Further, as object 530 is resized, a plurality of exemplary, predetermined aspect ratios may be snapped to (e.g., current aspect ratio 540, native aspect ratio 542, 1:1 aspect ratio 546, and 4:3 aspect ratio 548). Specifically in this example, detected user gesture 532 is in the direction of current aspect ratio 540.

UI 500L also depicts the display in the user interface of an exemplary affordance 539-L displayed in conjunction with user interface object 530. In this example, affordance 539-L is configured to display both the current size and the current aspect ratio of user interface object 530.

UI 500M illustrates that, in response to detected user gesture 532 in UI 500L, the device snaps the shape of currently selected user interface object 530 to current aspect ratio 540. UI 500M also depicts that affordance 539-M has been updated to display both the current size and the current aspect ratio of user interface object 530.

UI 500M also depicts resizing motion 532-2 of detected gesture 532, which in this example, is in the direction of native aspect ratio 542.

UI 500M illustrates that, in response to detected user gesture 532 in UI 500M, which includes resizing motion 532-2, the device snaps the shape of currently selected user interface object 530 to native aspect ratio 542. UI 500N also depicts that affordance 539-N has been updated to display both the current size and the current aspect ratio of user interface object 530, i.e., native aspect ratio 542.

UI 500N also depicts resizing motion 532-3 of detected gesture 532, which in this example, is in the direction of 1:1 aspect ratio 546.

UI 500O illustrates that, in response to detected user gesture 532 in UI 500N, which includes resizing motion 532-3, the device snaps the shape of currently selected user interface object 530 to 1:1 aspect ratio 546. UI 500N also depicts that affordance 539-N has been updated to display both the current size and the current aspect ratio of user interface object 530, i.e., 1:1 aspect ratio 546.

UI 500O also depicts resizing motion 532-4 of detected gesture 532, which in this example, is in the direction of 4:3 aspect ratio 548, which is also the aspect ratio of second user interface element 531, which neighbors user interface element 530.

UI 500P illustrates that, in response to detected user gesture 532 in UI 500O, which includes resizing motion 532-4, the device snaps the shape of currently selected user interface object 530 to 4:3 aspect ratio 548. UI 500P also depicts that affordance 539-P has been updated to display both the current size and the current aspect ratio of user interface object 530, i.e., 4:3 aspect ratio 548.

Though not explicitly illustrated, contact 532-c is lifted off of touch screen 112 in UI 500P, thus ending detected user gesture 532.

UI 500Q illustrates that after detecting the end of detected user gesture 532, user interface object 530 is no longer currently selected, and thus affordance 539 and resize handles, including first resize handle 530-1 and second resize handle 530-2, are no longer displayed.

In some embodiments, the following method is used to maintain aspect ratio while resizing at least one user interface object or user interface element:

Upon detecting the start of a user gesture to resize an object, save the aspect ratio and dimensions of the object being resized;

while detecting user gesture movement, calculate the width and height the object would be if it were to be resized in accordance with the user gesture movement;

calculate the aspect ratio of the change that would happen if the object were to be resized in accordance with the user gesture movement;

when the difference between the calculated aspect ratio and the original aspect ratio is below a predefined threshold:

when an option to snap to respective gridlines is activated:

when the original object width is greater than the original object height, round the value of the width adjustment that would happen in response to the user gesture movement so that the width adjustment falls on an even increment, and then derive the height adjustment value to maintain aspect ratio;

when the original object width is less than or equal than the original object height, round the value of the height adjustment that would happen in response to the user gesture movement so that the height adjustment falls on an even increment, and then derive the width adjustment value to maintain aspect ratio;

adjust the height and width of the object with the rounded and derived height and width adjustment values;

when the option to snap to respective gridlines is not activated, adjust the height and width of the object to an intersection point of a diagonal line extending from the object along the direction of the resize gesture and a line perpendicular to the diagonal line, wherein the perpendicular line crosses the current location of the user gesture, and the diagonal line crosses a plurality of possible object resize locations that maintain the original aspect ratio;

when the difference between the calculated aspect ratio and a predetermined aspect ratio is below a predefined threshold, adjust the height and width of the object with derived height and width adjustment values to correspond to the predetermined aspect ratio;

when the difference between the current aspect ratio and a 1:1 aspect ratio is below a predefined threshold, set the height and width of the object to the intersection point of a diagonal line extending from the object along the direction of the resize gesture and a line perpendicular to the diagonal line, wherein the perpendicular line crosses the current location of the user gesture, and the diagonal line crosses a plurality of possible object resize locations that maintain a 1:1 aspect ratio; and otherwise, resize the object in accordance with the user gesture movement.

In some embodiments, one or more techniques of the method just discussed are used to resize two or more currently selected user interface objects or user interface elements, so that while detecting a user gesture corresponding to an user interface object resize gesture: the two or more currently selected user interface objects are simultaneously resized in accordance with the detected user gesture, and the respective aspect ratios of the two or more currently selected user interface objects are also simultaneously adjusted.

In some embodiments, the predefined threshold for comparing the difference between two different aspect ratios is a set value, e.g., whether the difference between a current aspect ratio and the original aspect ratio is below a predefined value such as 0.2. For example, the device may determine whether a current aspect ratio and the original aspect ratio are within 0.2 of one another, 0.1, 0.3, or any suitable value. In some embodiments, the predefined threshold for comparing the difference between two different aspect ratios includes determining whether the two aspect ratios fall within a range of values, e.g., 0.1-0.3, 0.15-0.35, 0.2-0.4, or any suitable range; thus, when the difference between the two different aspect ratios falls within the predefined threshold range, the comparison is true, and when the difference between the two different aspect ratios does not fall within the predefined threshold range, the comparison is false. In some embodiments, the predefined threshold for comparing the difference between two different aspect ratios is the difference of the logarithms of the respective aspect ratios. For example, the following calculation and comparison to a tolerance variable can be used to determine whether to snap to the current aspect ratio or to the original aspect ratio:

$$|\log(\text{currentAspectRatio}) - \log(\text{originalAspectRatio})| < \text{tolerance}$$

where tolerance is 0.1 (or may be set to another suitable value), and the result of the comparison is used to determine which aspect ratio to snap to, i.e., snap to the current aspect ratio if the inequality is true, or snap to the original aspect ratio if the inequality is false.

Figure 6B:
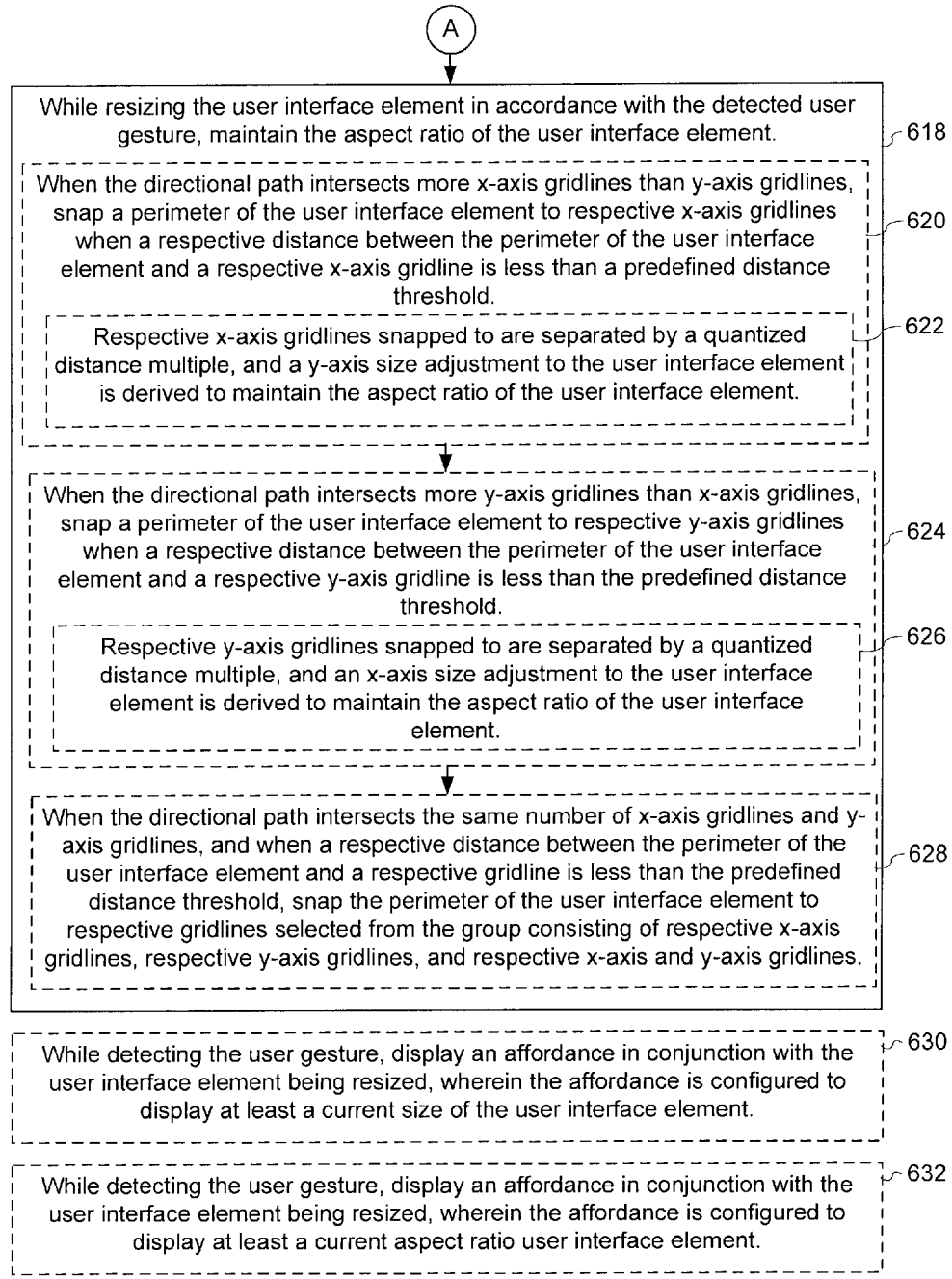

FIGS. 6A-6B are flow diagrams illustrating a method 600 of managing user interface content and user interface elements while resizing user interface content and user interface elements in accordance with some embodiments. The method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to maintain aspect ratio while resizing user interface objects. The method reduces the cognitive burden on a user when resizing user interface objects, thereby creating a more efficient human-machine interface. For battery-operated computing devices, enabling a user to resize user interface objects faster and more efficiently conserves power and increases the time between battery charges.

The method 600 is performed at a computing device with a display and one or more user input devices adapted to detect user gestures (e.g., FIG. 5A portable multifunction device 100, FIG. 3 device 300).

The device displays (602) on the display a user interface including at least one user interface element, wherein the user interface element is configured to be resized within the user interface in response to user gestures detected with the one or more user input devices, the user interface element has an aspect ratio, and the user interface element is displayed on the display in conjunction with a plurality of gridlines, which include a plurality of x-axis gridlines and a plurality of y-axis gridlines (e.g., FIG. 5A, section 5A1, display of electronic canvas 500, on which rectangle 501 is displayed at a slightly oblique angle, and has an aspect ratio, and the chart in section 5A2 depicts a plurality of x-axis and y-axis gridlines).

In some embodiments, at least one user interface element is displayed on an electronic canvas (604) (e.g., FIG. 5A, section 5A1, display of electronic canvas 500, on which rectangle 501 is displayed).

In some embodiments, the user interface element is rotated to an oblique angle on the electronic canvas before detecting the user gesture (606) (e.g., FIG. 5G, section 5G1, rectangle 516 is displayed at an oblique angle).

In some embodiments, the user interface element includes at least a first resize handle and a second resize handle, wherein the first and second resize handles are positioned on opposite sides of the user interface element during the detected user gesture (608) (e.g., FIG. 5B, section 5B1, resize handles are displayed for rectangle 501, including first resize handle 501-1 and second resize handle 501-2, which are on opposite corners of rectangle 501).

In some embodiments, resize handles include an activation region proximate to and surrounding the resize handle to make it easier for a user to perform a gesture involving selection or movement of the resize handle. For purposes of clarity, these activation regions are not displayed herein.

In some embodiments, the display and at least one of the one or more user input devices comprise a touch-screen display (610) (e.g., FIG. 5A, section 5A1, touch screen 112).

In some embodiments, the plurality of gridlines is visibly displayed (612).

The device detects (614) a user gesture performed with one or more of the one or more user input devices, the user gesture corresponding to a gesture to resize the user interface element (e.g., FIG. 5B, section 5B1, user gesture 505, which includes a directional path 505-1 and point of contact 505p).

In some embodiments, the detected user gesture includes a point of contact corresponding to a first resize handle of the two or more resize handles, and a second resize handle of the two or more resize handles corresponds to a second location of the user interface element that is opposite the first resize handle (615) (e.g., FIG. 5B, section 5B1, user gesture 505, which includes a directional path 505-1 and point of contact 505p, where the point of contact 505p corresponds to first resize handle 501-1, and first resize handle 501-1 and second resize handle 501-2 are on opposite corners of rectangle 501).

In some embodiments, the second resize handle is dynamically designated as an origin handle for the duration of the detected user gesture, and location data associated with the origin handle is used to derive one or more parameters for resizing the user interface element.

In response to detecting the user gesture, the device resizes the user interface element in accordance with the detected user gesture, wherein the detected user gesture has a directional path that intersects at least some of the plurality of gridlines (616) (e.g., FIG. 5C, section 5C1, in response to user gesture 505 in section 5B1 of FIG. 5B, rectangle 501 has been snapped to snap line 508-1, thus resizing it; FIG. 5B, section 5B1 gesture 505 has directional path 505-1 extending through snap lines 508-1 through 508-6, which correspond to the gridlines reflected in the chart in section 5B2, i.e., chart 5B2 includes a representation of point of contact 505p and directional path 505-1, which crosses respective x-axis gridlines 505-x1, 505-x2, 505-x3, 505-x4, and 505-x5, as well as respective y-axis gridlines 505-y1, 505-y2, and 505-y3).

While resizing the user interface element in accordance with the detected user gesture, the device maintains (618) the aspect ratio of the user interface element (e.g., FIG. 5C, section 5C1, rectangle 501 has been snapped to snap line 508-1, and as indicated by affordance 503-C, the width of rectangle 501 is 4 cm, while the height is 6.6 cm, so the aspect ratio of rectangle 501 was maintained at a 3:5 aspect ratio).

The device maintaining the aspect ratio of the user interface element includes that when the directional path intersects more x-axis gridlines than y-axis gridlines, the device snaps a perimeter of the user interface element to respective x-axis gridlines when a respective distance between the perimeter of the user interface element and a respective x-axis gridline is less than a predefined distance threshold (620) (e.g., FIG. 5C, section 5C2, chart 5C2 includes a representation of point of contact 505*p* and directional path 505-1, which crosses respective x-axis gridlines 505-*x*1, 505-*x*2, 505-*x*3, 505-*x*4, and 505-*x*5, as well as respective y-axis gridlines 505-*y*1, 505-*y*2, and 505-*y*3, indicating that directional path 505-1 crosses more respective x-axis gridlines than respective y-axis gridlines; chart 5C2 also illustrates the corresponding location of point of contact 505*p* in relation to directional path 505-1 of user gesture 505, where the current location is at x-axis gridline 505-*x*1, thus when rectangle 501 was snapped to snap line 508-1 in 5C1, the snapping was to a respective x-axis gridline, i.e. 505-*x*1).

In some embodiments, respective x-axis gridlines snapped to are separated by a quantized distance multiple (e.g., 5 pixels, 10 pixels, 15 pixels, ⅛ cm, ¼ cm, ⅓ cm, ½ cm, or any suitable distance), and a y-axis size adjustment to the user interface element is derived to maintain the aspect ratio of the user interface element (622) (e.g., FIG. 5C, section 5C1, size changes in the x-direction, i.e., width in this example, are fixed by the quantized distance multiple 509, and a y-axis size adjustment, i.e., height in this example, to the user interface element is derived to maintain the aspect ratio of the user interface element, specifically, when rectangle 501 is snapped to 4 cm width, i.e., x-axis size, the height of rectangle 501 is derived, namely 6.6 cm height, i.e., y-axis size).

In some embodiments, derivation of the y-axis size adjustment to maintain aspect ratio includes calculation of a y-axis size adjustment using at least a distance corresponding to the quantized distance multiple, the aspect ratio of the user interface element, and/or the origin handle.

The device maintaining the aspect ratio of the user interface element includes that when the directional path intersects more y-axis gridlines than x-axis gridlines, the device snaps a perimeter of the user interface element to respective y-axis gridlines when a respective distance between the perimeter of the user interface element and a respective y-axis gridline is less than the predefined distance threshold (624) (e.g., FIG. 5H, chart in section 5H2 illustrates that point of contact 518*p* and directional path 518-1 crosses respective x-axis gridline 522-*x*1, as well as respective y-axis gridlines 522-*y*1, 522-*y*2, 522-*y*3, 522-*y*4, 522-*y*5, and 522-*y*6, so directional path 518-1 crosses more respective y-axis gridlines than respective x-axis gridlines; FIG. 5I, section 5I1 depicts that in response to user gesture 518 in UI 500H, rectangle 501 has been snapped to snap line 520-1).

In some embodiments, respective y-axis gridlines snapped to are separated by a quantized distance multiple, and an x-axis size adjustment to the user interface element is derived to maintain the aspect ratio of the user interface element (626).

In some embodiments, derivation of the x-axis size adjustment to maintain aspect ratio includes calculation of a x-axis size adjustment using at least a distance corresponding to the quantized distance multiple, the aspect ratio of the user interface element, and/or the origin handle.

In some embodiments, the device maintaining the aspect ratio of the user interface element includes that when the directional path intersects the same number of x-axis gridlines and y-axis gridlines, and when a respective distance between the perimeter of the user interface element and a respective gridline is less than the predefined distance threshold, the device snaps the perimeter of the user interface element to respective gridlines selected from the group consisting of respective x-axis gridlines, respective y-axis gridlines, and respective x-axis and y-axis gridlines (628).

In some embodiments, while detecting the user gesture, the device displays an affordance in conjunction with the user interface element being resized, wherein the affordance is configured to display at least a current size of the user interface element (630) (e.g., FIG. 5B, section 5B1 affordance 503-B is configured to display both the current size and the current aspect ratio of user interface object 501).

In some embodiments, while detecting the user gesture, the device displays an affordance in conjunction with the user interface element being resized, wherein the affordance is configured to display at least a current aspect ratio user interface element (632) (e.g., FIG. 5B, section 5B1 affordance 503-B is configured to display both the current size and the current aspect ratio of user interface object 501).

In some embodiments, one or more techniques of the method 600 are used to resize two or more currently selected user interface elements, so that while detecting a user gesture corresponding to an user interface element resize gesture: the two or more currently selected user interface elements are simultaneously resized in accordance with the detected user gesture, and the respective aspect ratios of the two or more currently selected user interface elements are also simultaneously adjusted.

FIG. 6C is a flow diagram illustrating a method 650 of managing user interface content and user interface elements while resizing user interface content and user interface elements in accordance with some embodiments. The method 650 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface.

Some operations in method 650 may be combined and/or the order of some operations may be changed. Additionally, operations in method 650 may be combined with some operations in method 600 and/or the order of some combined operations may be changed.

As described below, the method 650 provides an intuitive way to maintain aspect ratio while resizing user interface objects. The method reduces the cognitive burden on a user when resizing user interface objects, thereby creating a more efficient human-machine interface. For battery-operated computing devices, enabling a user to resize user interface objects faster and more efficiently conserves power and increases the time between battery charges.

The method 650 is performed at a computing device with a display and one or more user input devices adapted to detect user gestures (e.g., FIG. 5A portable multifunction device 100, FIG. 3 device 300).

The device displays on the display a user interface including at least a first user interface element, wherein the first user interface element is configured to be resized within the user interface in response to user gestures, the first user interface element has a first aspect ratio, the first user interface element has an initial size, the first user interface element includes at least a first resize handle and a second resize handle, and, the first and second resize handles are positioned on opposite sides of the user interface element (652) (e.g., FIG. 5L, user interface object 530 has resize handles, including first resize handle 530-1 and second resize handle 530-2 which are positioned on opposite sides of user interface object 530; user interface object 530 has an aspect ratio and can be resized to an adjusted size that is different from the initial size of object 530).

In some embodiments, the user interface element is rotated to an oblique angle on the electronic canvas before detecting the user gesture (654) (e.g., FIG. 5G, section 5G1, rectangle 516 is displayed at an oblique angle).

The device detects (656) a user gesture performed with one or more of the one or more user input devices, the user gesture corresponding to a gesture to resize the user interface element, and the user gesture is performed at a location corresponding to the first resize handle (e.g., FIG. 5L, detected user gesture 532 including contact 532-c and resizing motion 532-1, where contact 532-c is at resize handle 530-1 of currently selected user interface object 530).

In response to detecting the user gesture, the device resizes (658) the user interface element in accordance with the detected user gesture (e.g., FIG. 5M, in response to detected user gesture 532 in FIG. 5L, the device resizes the currently selected user interface object 530 to current aspect ratio 540, which includes resizing the user interface object in accordance with resizing motion 532-1).

While resizing the user interface element in accordance with the detected user gesture, the device snaps (660) the first user interface element to an adjusted size that is different from the initial size, wherein the adjusted size corresponds to a predetermined aspect ratio (e.g., FIG. 5M, in response to detected user gesture 532 in FIG. 5L, the device snaps the shape of currently selected user interface object 530 to current aspect ratio 540, which includes resizing the user interface object to a size that is different from the initial size).

In some embodiments, snapping the first user interface element to an adjusted size that is different from the initial size includes snapping the first user interface element to two or more adjusted sizes that are different from the initial size, wherein the two or more adjusted sizes correspond to two or more distinct predetermined aspect ratios (e.g., in FIG. 5N, the device snapped currently selected user interface object 530 to native aspect ratio 542, and in FIG. 5O, the device snapped currently selected user interface object 530 to 1:1 aspect ratio 546).

In some embodiments, the predetermined aspect ratio is selected from the group consisting of 1:1 aspect ratio, 2:3 aspect ratio, 3:2 aspect ratio, 3:5 aspect ratio, 5:3 aspect ratio, 5:7 aspect ratio, 7:5 aspect ratio, 8:10 aspect ratio, 10:8 aspect ratio, 3:4 aspect ratio, 4:3 aspect ratio, 16:9 aspect ratio, 9:16 aspect ratio, and an aspect ratio of the display (662).

In some embodiments, the predetermined aspect ratio is the first aspect ratio of the first user interface element (664), e.g, the aspect ratio of the first user interface element is restored, i.e., after adjustments, the aspect ratio snaps to its original value during an object resize gesture, which may be the original proportions of an image.

In some embodiments, the adjusted size corresponds to a predefined aspect ratio. In some embodiments, the adjusted size corresponds to a preselected aspect ratio. In some embodiments, the aspect ratio corresponding to the adjusted size of the user interface element is that of a neighboring user interface element, any of a number of predefined aspect ratios, such as 1:1, 2:3, 3:2, 3:5, 5:3, 5:7, 7:5, 8:10, 10:8, 3:4, 4:3, 16:9, 9:16, an aspect ratio of the display, an aspect ratio of the user interface element being resized at the time of the initiation of the detected user gesture, an aspect ratio based on predefined dimensions of the user interface element, e.g., photo images having an initial size and aspect ratio, etc., or any suitable aspect ratio.

In some embodiments, the displayed user interface includes a second user interface element having a second aspect ratio that is different than the first aspect ratio, the second user interface element is within a predefined distance of the first user interface element i.e., the first and second user interface elements are neighbors, or are proximate to one another, and the predetermined aspect ratio is the second aspect ratio (666) (e.g., FIG. 5P, the device snaps the shape of currently selected user interface object 530 to 4:3 aspect ratio 548, which is the aspect ratio of user interface object 531, which is near by user interface object 530).

In some embodiments, while detecting the user gesture, the device displays an affordance in conjunction with the user interface element being resized, wherein the affordance is configured to display at least a current size of the user interface element (668) (e.g., FIG. 5P, affordance 539-P displays both the current size and the current aspect ratio of user interface object 530).

In some embodiments, while detecting the user gesture, the device displays an affordance in conjunction with the user interface element being resized, wherein the affordance is configured to display at least a current aspect ratio user interface element (670) (e.g., FIG. 5P, affordance 539-P displays both the current size and the current aspect ratio of user interface object 530).

In some embodiments, one or more techniques of the method 650 are used to resize two or more currently selected user interface elements, so that while detecting a user gesture corresponding to an user interface element resize gesture: the two or more currently selected user interface elements are simultaneously resized in accordance with the detected user gesture, and the respective aspect ratios of the two or more currently selected user interface elements are also simultaneously adjusted.

The steps in the information processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a computing device with a display and one or more user input devices adapted to detect user gestures:
displaying on the display a user interface including at least one user interface element, wherein:
the user interface element is configured to be resized within the user interface in response to user gestures detected with the one or more user input devices,
the user interface element has an aspect ratio, and
the user interface element is displayed on the display in conjunction with a plurality of gridlines, which include a plurality of x-axis gridlines and a plurality of y-axis gridlines;
detecting a user gesture performed with one or more of the one or more user input devices, the user gesture corresponding to a gesture to resize the user interface element;

in response to detecting the user gesture, resizing the user interface element in accordance with the detected user gesture, wherein the detected user gesture has a directional path that intersects at least some of the plurality of gridlines;

while resizing the user interface element in accordance with the detected user gesture, maintaining the aspect ratio of the user interface element, wherein maintaining the aspect ratio of the user interface element includes:

when the directional path intersects more x-axis gridlines than y-axis gridlines, snapping a perimeter of the user interface element to respective x-axis gridlines when a respective distance between the perimeter of the user interface element and a respective x-axis gridline is less than a predefined distance threshold, and, when the directional path intersects more y-axis gridlines than x-axis gridlines, snapping a perimeter of the user interface element to respective y-axis gridlines when a respective distance between the perimeter of the user interface element and a respective y-axis gridline is less than the predefined distance threshold.

2. The method of claim 1, further comprising:
when the directional path intersects the same number of x-axis gridlines and y-axis gridlines, and when a respective distance between the perimeter of the user interface element and a respective gridline is less than the predefined distance threshold, snapping the perimeter of the user interface element to respective gridlines selected from the group consisting of respective x-axis gridlines, respective y-axis gridlines, and respective x-axis and y-axis gridlines.

3. The method of claim 1, wherein:
the detected user gesture includes a point of contact corresponding to a first resize handle of the two or more resize handles, and
a second resize handle of the two or more resize handles corresponds to a second location of the user interface element that is opposite the first resize handle.

4. The method of claim 1, wherein respective x-axis gridlines snapped to are separated by a quantized distance multiple, and a y-axis size adjustment to the user interface element is derived to maintain the aspect ratio of the user interface element.

5. The method of claim 1, wherein respective y-axis gridlines snapped to are separated by a quantized distance multiple, and an x-axis size adjustment to the user interface element is derived to maintain the aspect ratio of the user interface element.

6. The method of claim 1, further comprising while detecting the user gesture, displaying an affordance in conjunction with the user interface element being resized, wherein the affordance is configured to display at least a current size of the user interface element.

7. The method of claim 1, further comprising while detecting the user gesture, displaying an affordance in conjunction with the user interface element being resized, wherein the affordance is configured to display at least a current aspect ratio user interface element.

8. The method of claim 1, wherein the at least one user interface element is displayed on an electronic canvas.

9. The method of claim 1, wherein the user interface element is rotated to an oblique angle on the electronic canvas before detecting the user gesture.

10. The method of claim 1, wherein the display and at least one of the one or more user input devices comprise a touch-screen display.

11. The method of claim 1, wherein the user interface element includes at least a first resize handle and a second resize handle, wherein the first and second resize handles are positioned on opposite sides of the user interface element during the detected user gesture.

12. The method of claim 1, wherein the plurality of gridlines is visibly displayed.

13. A computing device, comprising:
a display;
one or more processors;
one or more user input devices adapted to detect user gestures;
memory; and
one or more programs, wherein the one or more programs are stored in the memory and configured to be executed by the one or more processors, the one or more programs including instructions for:
displaying on the display a user interface including at least one user interface element, wherein:
the user interface element is configured to be resized within the user interface in response to user gestures detected with the one or more user input devices,
the user interface element has an aspect ratio, and
the user interface element is displayed on the display in conjunction with a plurality of gridlines, which include a plurality of x-axis gridlines and a plurality of y-axis gridlines;
detecting a user gesture performed with one or more of the one or more user input devices, the user gesture corresponding to a gesture to resize the user interface element;
in response to detecting the user gesture, resizing the user interface element in accordance with the detected user gesture, wherein the detected user gesture has a directional path that intersects at least some of the plurality of gridlines;
while resizing the user interface element in accordance with the detected user gesture, maintaining the aspect ratio of the user interface element, wherein maintaining the aspect ratio of the user interface element includes:
when the directional path intersects more x-axis gridlines than y-axis gridlines, snapping a perimeter of the user interface element to respective x-axis gridlines when a respective distance between the perimeter of the user interface element and a respective x-axis gridline is less than a predefined distance threshold, and,
when the directional path intersects more y-axis gridlines than x-axis gridlines, snapping a perimeter of the user interface element to respective y-axis gridlines when a respective distance between the perimeter of the user interface element and a respective y-axis gridline is less than the predefined distance threshold.

14. A non-transitory computer readable storage medium storing one or more programs, the one or more programs comprising instructions, which when executed by a computing device with a display and one or more user input devices adapted to detect user gestures, cause the device to:

display on the display a user interface including at least one user interface element, wherein:
  the user interface element is configured to be resized within the user interface in response to user gestures detected with the one or more user input devices,
  the user interface element has an aspect ratio, and
  the user interface element is displayed on the display in conjunction with a plurality of gridlines, which include a plurality of x-axis gridlines and a plurality of y-axis gridlines;
detect a user gesture performed with one or more of the one or more user input devices, the user gesture corresponding to a gesture to resize the user interface element;
in response to detecting the user gesture, resize the user interface element in accordance with the detected user gesture, wherein the detected user gesture has a directional path that intersects at least some of the plurality of gridlines;
while resizing the user interface element in accordance with the detected user gesture, maintain the aspect ratio of the user interface element, wherein maintaining the aspect ratio of the user interface element includes:
  when the directional path intersects more x-axis gridlines than y-axis gridlines, snap a perimeter of the user interface element to respective x-axis gridlines when a respective distance between the perimeter of the user interface element and a respective x-axis gridline is less than a predefined distance threshold, and,
  when the directional path intersects more y-axis gridlines than x-axis gridlines, snap a perimeter of the user interface element to respective y-axis gridlines when a respective distance between the perimeter of the user interface element and a respective y-axis gridline is less than the predefined distance threshold.

* * * * *